(12) United States Patent
Gopalakrishnan

(10) Patent No.: US 10,693,622 B2
(45) Date of Patent: Jun. 23, 2020

(54) PRODUCT MANAGEMENT SYSTEM THAT EXTRACTS MODIFICATIONS

(75) Inventor: Prasanth Gopalakrishnan, Kothanallor (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 940 days.

(21) Appl. No.: 12/821,720

(22) Filed: Jun. 23, 2010

(65) Prior Publication Data

US 2011/0320365 A1 Dec. 29, 2011

(51) Int. Cl.
*H04L 7/00* (2006.01)
*G06Q 10/06* (2012.01)
*G06Q 10/10* (2012.01)

(52) U.S. Cl.
CPC ..... *H04L 7/0016* (2013.01); *G06Q 10/06312* (2013.01); *G06Q 10/103* (2013.01)

(58) Field of Classification Search
CPC .................................................. G05B 13/04
USPC ............................................. 705/7.11–7.42
See application file for complete search history.

(56) References Cited

U.S. PATENT DOCUMENTS

| | | | | |
|---|---|---|---|---|
| 5,481,718 | A * | 1/1996 | Ryu et al. | 719/316 |
| 6,009,406 | A * | 12/1999 | Nick | 705/7.24 |
| 6,625,616 | B1 * | 9/2003 | Dragon et al. | 707/802 |
| 7,159,175 | B2 * | 1/2007 | Ishii et al. | 715/716 |
| 7,389,265 | B2 * | 6/2008 | Lawrence et al. | 705/38 |
| 7,574,483 | B1 * | 8/2009 | Alger et al. | 709/217 |
| 7,693,586 | B2 | 4/2010 | Dumas et al. | |
| 8,447,423 | B2 * | 5/2013 | Budiman et al. | 700/104 |
| 2005/0193033 | A1 * | 9/2005 | Davis et al. | 707/201 |
| 2005/0216885 | A1 * | 9/2005 | Ireland | 717/108 |
| 2006/0161879 | A1 * | 7/2006 | Lubrecht et al. | 717/101 |
| 2007/0214159 | A1 * | 9/2007 | Lawson | G06F 17/30377 |
| 2008/0126221 | A1 * | 5/2008 | Swanson | 705/26 |
| 2009/0018996 | A1 * | 1/2009 | Hunt et al. | 707/2 |
| 2009/0112739 | A1 | 4/2009 | Barassi et al. | |
| 2009/0144120 | A1 * | 6/2009 | Ramachandran | 705/9 |
| 2009/0276433 | A1 | 11/2009 | Fosback et al. | |
| 2009/0282065 | A1 * | 11/2009 | Brimble et al. | 707/101 |
| 2010/0074509 | A1 * | 3/2010 | Laaser et al. | 382/138 |

(Continued)

OTHER PUBLICATIONS

Oracle; An Oracle White Paper, "The Business Value of Upgrading to Oracle E-Business Suite Financials", Release 12, May 2008, pp. 1-18, http://www.oracle.com/applications/oracle-ebs12-financials-business-value-to-upgrade.pdf.

(Continued)

*Primary Examiner* — Richard N Scheunemann
(74) *Attorney, Agent, or Firm* — Potomac Law Group, PLLC

(57) ABSTRACT

A product management system receives one or modifications of a product, and separating the one or more modifications into two collections. The first collection includes one or more modifications that require approval. The second collection includes the one or more modifications. The product management system adds each modification from the first collection to a change management system, and stores each modification from the second collection that is not also in the first collection into production data. The product management system initiates a workflow for the change management system.

19 Claims, 24 Drawing Sheets

(56) References Cited

U.S. PATENT DOCUMENTS

2010/0076797 A1* 3/2010 Doerfler et al. .................. 705/7
2010/0110933 A1* 5/2010 Wilcock et al. .............. 370/255

OTHER PUBLICATIONS

Oracle, Oracle ADF 11g Primer, "Introduction to the Building Blocks of a Fusion Web Application," pp. 1-12, Apr. 2007, http://www.oracle.com/technology/products/jdev/11/how-tos/oracle%20adf%2011g%20primer.pdf.

* cited by examiner

PRODUCT MANAGEMENT SYSTEM THAT EXTRACTS MODIFICATIONS

FIELD

One embodiment is directed generally to a computer system, and in particular to a product management system.

BACKGROUND

A product management system is a computer system configured for the designing, manufacturing, planning, forecasting, and marketing of a product (also identified as an "item"), throughout its lifecycle. A product can be as complex as an aircraft, and can include thousands of components, or the product can be as simple as a shirt. In a product management system, product information includes attributes about the product itself, such as size, dimensions, weight, speed, power, output, fuel consumption estimation, model number, manufacturer information, capabilities, quality information, and safety information, depending on the type of product. Product information can also include attributes such as organization-specific attributes related to the product, supplier attributes, product structure attributes, such as bill of materials attributes, and even user-defined attributes. Product information is generally stored across multiple tables of a database, and are generally tightly coupled to each other based on product key information.

A conventional product management system can also provide for change management, such as making changes to attributes of an existing product after the product has been entered into the product management system. The product management system can impose restrictions that certain types of product attribute changes require approval before they are propagated to the product management system's production data. For example, product attribute changes that are simple and do not impact other aspects of the product, can be directly applied to production data of the product management system. However, product attribute changes that are complex and will directly impact other aspects of the product, such as product design, product production, or product sales can require an approval before they are applied to the production data. In certain conventional product management systems, business rules can be defined for identifying such scenarios. Business rules can be of three types. The first type is assignment rules, which can assign a value to certain attributes based on values of other attributes. The second type is validation rules, which checks if a value of a specific attributes is valid. The condition can be based on other attributes as well. The third type is approval rules, which can identify whether a modification requires approval, and thus, requires a change order.

Generally, if an attribute change requires approval, whether identified by a business rule or through some other mechanism, the product management system can require that a user create a change order which includes the requested attribute change. A change order is an example of a change management system which can allow user to add multiple revised items, where a revised item points to a specific revision or version of the item and can include a scheduled date on which the change is scheduled for. The user can then perform the item changes in the context of these revised items, such as adding, deleting or updating item information or other related information. Once a user has created the change order, the product management system can transmit the change order to appropriate assignees of various phases of a workflow, such as a review phase or an approval phase. The changes do not go directly to the production data of the product management system, and instead, must await appropriate approval. Once the change order is approved by the appropriate assignee, the product management system can process the approved change order and schedule the approved changes. Upon the arrival of the scheduled date, the product management system copies the changes to the production data.

SUMMARY

One embodiment is directed to a computer-readable medium having instructions stored thereon that, when executed by a processor, cause the processor to perform a method. The instructions include receiving one or more modifications of a product, and separating the modifications into two collections. The first collection includes one or more modifications that require approval. The second collection includes the one or more modifications. The instructions further include adding each modification from the first collection to a change management system, and storing each modification from the second collection that is not also in the first collection into production data. The instructions further include initiating a workflow for the change management system.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

As described above, a conventional product management system can impose restrictions that certain types of product attribute changes require approval before they are processed by the product management system, and can require that a user create a change order, or some other approval mechanism of a change management system, which includes the requested changes. However, in general, a conventional product management system cannot determine that a requested change requires an approval until a user enters the requested change through a user interface and attempts to validate the change through the product management system. Upon determining that the requested change requires approval, the user has to revert the requested change, leave the original production context, open a new user interface in a change order context and reenter the requested change. This is because production cannot accommodate the requested change because the requested change requires approval, per one or more business rules. In the scenario of multiple changes, a user has to revert all the changes in the original production context, and reenter all the changes in the change order context, even if only one change of the multiple changes required approval. This generally results in a series of cumbersome manual steps for the user. A user can alternately only reenter the changes that require approval in the change context, switch back to the production context, and reenter the remaining changes in the product context. However, this generally results in even more manual steps, and the user cannot see entire changes together simultaneously at the time of entering the changes.

According to one embodiment of the invention, a product management system allows a user to make modifications to product information in a production context, and save the product information modifications without leaving the production context, even if the modifications require approval. This is accomplished through one of two methods. In the first method, the product information modifications are filtered and separated into two categories. The first category includes product information modifications that require approval. The second category includes all product information modifications. For production information changes in the first category, a workflow for a change management system is initiated from the production context, and the production information changes in the first category are inserted into the change management system. Production information changes in the second category that are not also in the first category are directly applied to the database. In the second method, a change management system workflow is initiated from the production context, and all production information modifications are inserted into the change management system. According to an embodiment of the invention, the change management system includes a change order.

Figure 1:
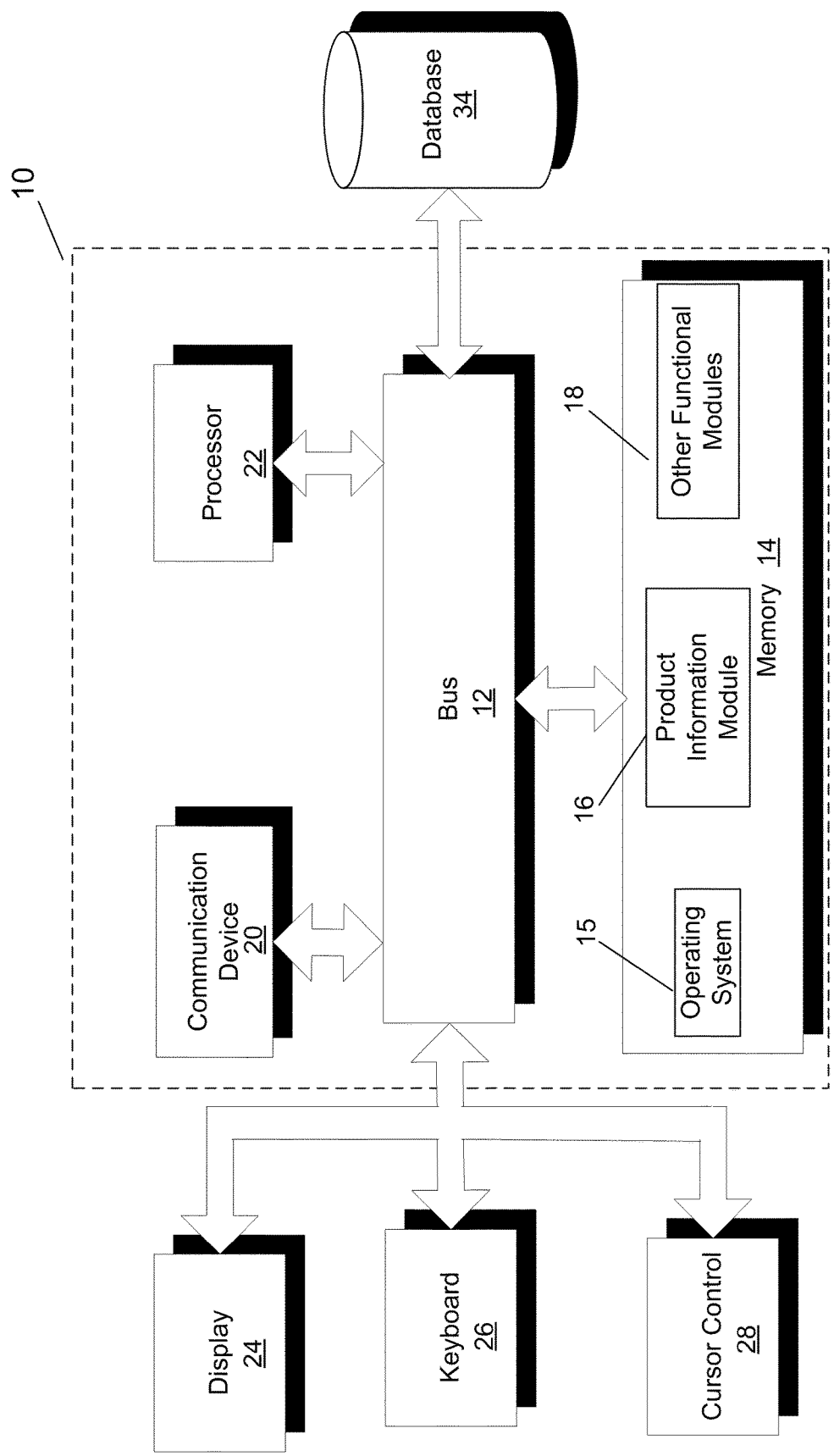
FIG. 1 illustrates a block diagram of a system that may implement an embodiment of the invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. Computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, product information module 16, as well as other functional modules 18. Operating system 15 can provide an operating system functionality for system 10. Product information module 16 can provide functionality for processing product information, as will be described in more detail below. System 10 can also be part of a larger system. Thus, system 10 can include one or more additional functional modules 18 to include the additional functionality. For example, functional modules 18 may include modules that are part of the "Fusion" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

According to an embodiment of the invention, a product management system is based on a Model-View-Controller ("MVC") design pattern. According to the MVC design pattern, the product management system is separated into three layers: (1) a model layer; (2) a view layer; and (3) a controller layer. The model layer handles interactions with a data source and runs the business logic in the product management system. A data source can be any kind of persistent data storage, such as a database, or a computer file. Thus the model layer represents a set of data values and business logic for the product management system. The view layer handles the user interface portion of the product management system. The view layer controls the appearance and layout of the user interface, and further controls how a user interacts with the product management system. The controller layer manages the application flow and acts as an interface between the model layer and the view layer. The controller layer controls a user's navigation of the product management system.

Figure 2:
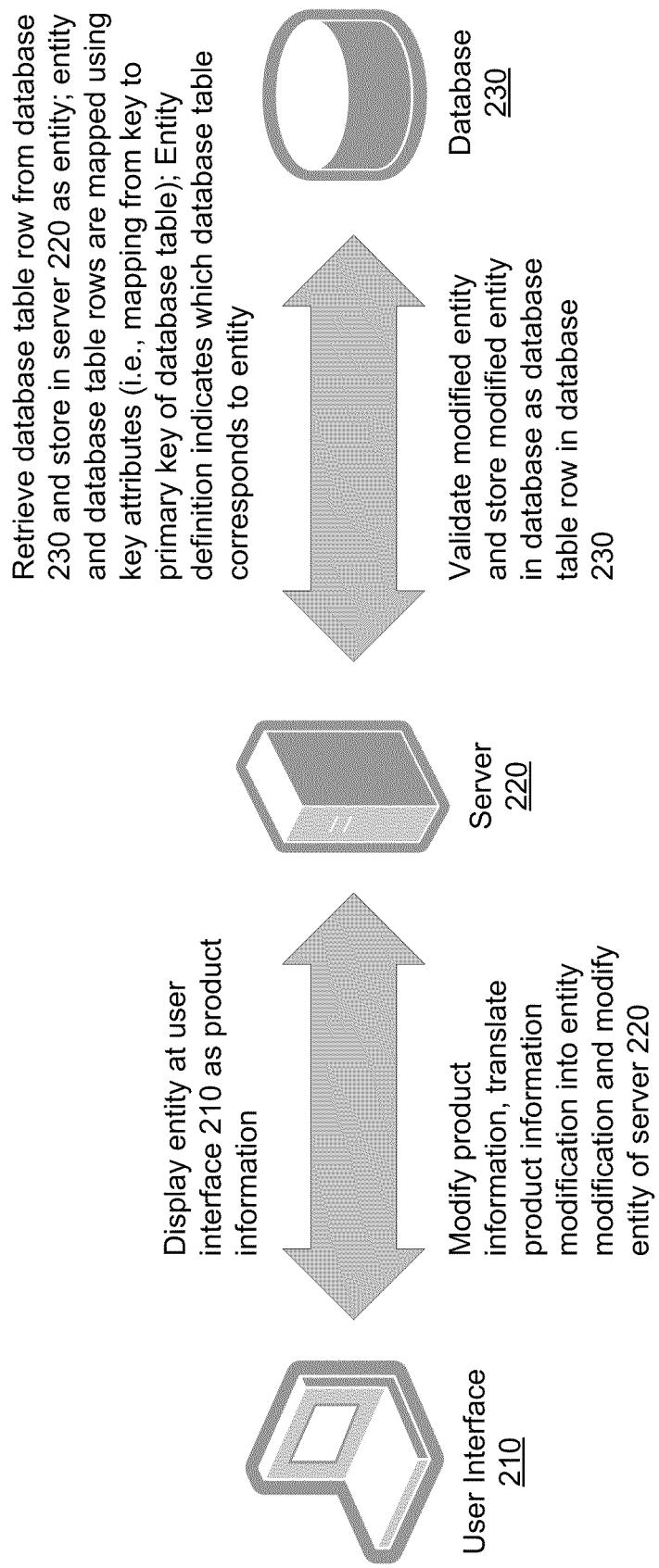
FIG. 2 illustrates a product management system according to an embodiment of the invention.

FIG. 2 illustrates a product management system according to an embodiment of the invention. According to the embodiment, the product management system is based on an MVC design pattern. Also according to the embodiment, the model layer of the MVC design pattern is represented by Application Development Framework ("ADF") Business Components. ADF Business Components provide application objects for querying, inserting, updating and deleting data from a database while enforcing appropriate business rules. ADF Business Components provides an interface between a database and the other layers of the ADF However, in alternative embodiments, the model layer of the MVC design pattern can be represented by other technologies, such as Enterprise Java Beans.

The product management system includes user interface 210, server 220, and database 230 according to the embodiment of the invention. User interface 210 is a component of the product management system configured to allow a user to interact with the product management system. User interface 210 can be configured to display images to the user that correspond to data in the product management system, and user interface 210 can be configured to allow a user to perform interactive operations such as querying and modifying data of the product management system. User interface 210 can be a software module configured to run a computer that includes a processor and a memory, such as a personal computer, desktop computer, a laptop computer, a computer terminal, a personal digital assistant ("PDA"), a mobile phone, and a smartphone. User interface 210 can also be an Internet browser configured to run on a computer that includes a processor and memory, such as the previously-mentioned types of computers.

Server 220 is a component of the product management system configured to store and perform the business logic of the product management system, and to represent the data of the product management system in a memory. Business logic includes the functional algorithms that handle information representation and exchange between user interface 210 and database 230. Business logic can model a product, prescribe how a product interacts with another product, and can enforce how a product is accessed and updated. Server 220 can be a software module configured to run on a computer that includes a processor and memory, such as a personal computer, desktop computer, a laptop computer, or a computer terminal.

Database 230 is a component of the product management system configured to persist the data of the product management system. Database 230 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, when information relating to a specific product is persisted to database 230, the product information can be stored across rows of multiple database tables in database 230, where the rows can be linked by an identity, such as a product key. Likewise, when information relating a specific product is stored in a memory in server 220, an entity object (i.e., "entity") that corresponds to the specific product is created which includes product information and corresponding business logic, where the product entity can be made up of individual entities, with each individual entity corresponding to a specific piece of product information. The entity object is described in more detail in relation to FIG. 3.

Figure 11:
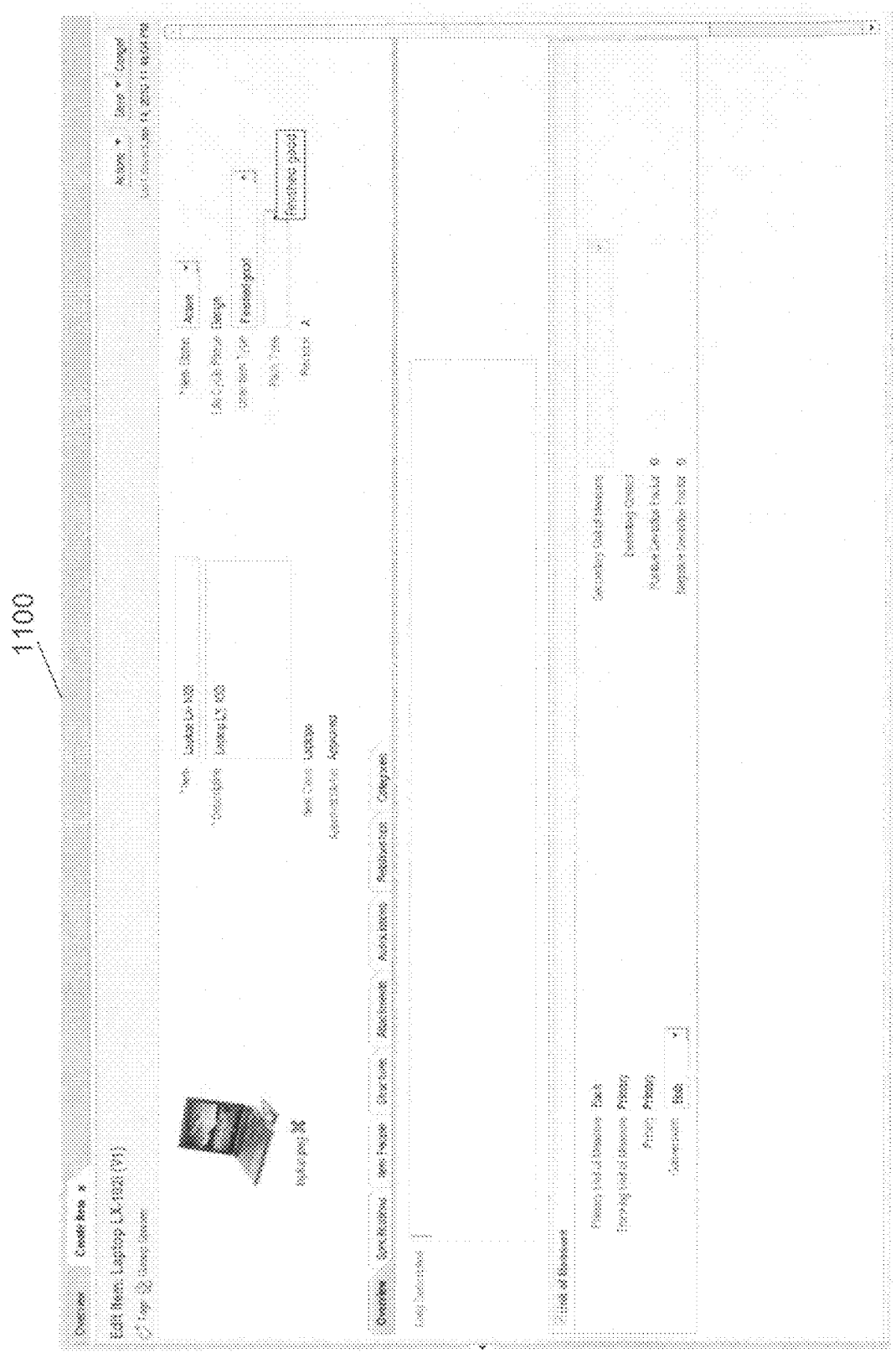
FIG. 11 illustrates a user interface for modifying product information according to an embodiment of the invention.

According to the embodiment, as illustrated in FIG. 2, when the product management system displays product information to a user, one or more database table rows of database 230 corresponding to the product information are retrieved and stored in server 220 as one or more entities. In the embodiment, an entity of server 220 and one or more database table rows of database 230 are mapped using key attributes (i.e., a key of an entity of server 220 is mapped to one or more database table rows of database 230). In addition, an entity definition indicates which database table of database 230 corresponds to the entity of server 220. After server 220 has retrieved the one or more database table rows and stored the product information in server 220 as one or more entities, the one or more entities are displayed at user interface 210 as product information. FIG. 11 provides an example of product information displayed in a user interface, as will be discussed in more detail.

After the one or more entities corresponding to product information are displayed at user interface 210, user interface 210 allows a user to modify product information. For example, a user can highlight a product attribute that displays product information, and can modify the displayed product information through the use of an input device. A user can modify product information for any and all displayed attributes of a product.

After a user modifies product information, server 220 translates each product information modification into a corresponding entity modification and modifies the corresponding entity. If the product information modification corresponds to an existing entity in server 220, the existing entity is marked as modified. If the product information modification results in the creation of a new entity in server 220, the new entity is marked as new.

Next, server 220 validates each modified and new entity. For example, server 220 determines whether the product information modification is allowed according to the business logic for each modified and new entity. If the product information modification is allowed, the modified entity, or new entity, is stored as a database table row in database 230. If the product information modification results in a new entity, then a corresponding database table row is inserted in to the appropriate database table of database 230. If the modification results in an entity being deleted, then the corresponding database table row is deleted from database 230. If the modification results in a entity being modified, then the corresponding database table row is updated accordingly. If the product modification is not allowed, the modified or new entity does not get stored as a database table row in database 230, and an error can be displayed to the user at user interface 210.

Figure 3:
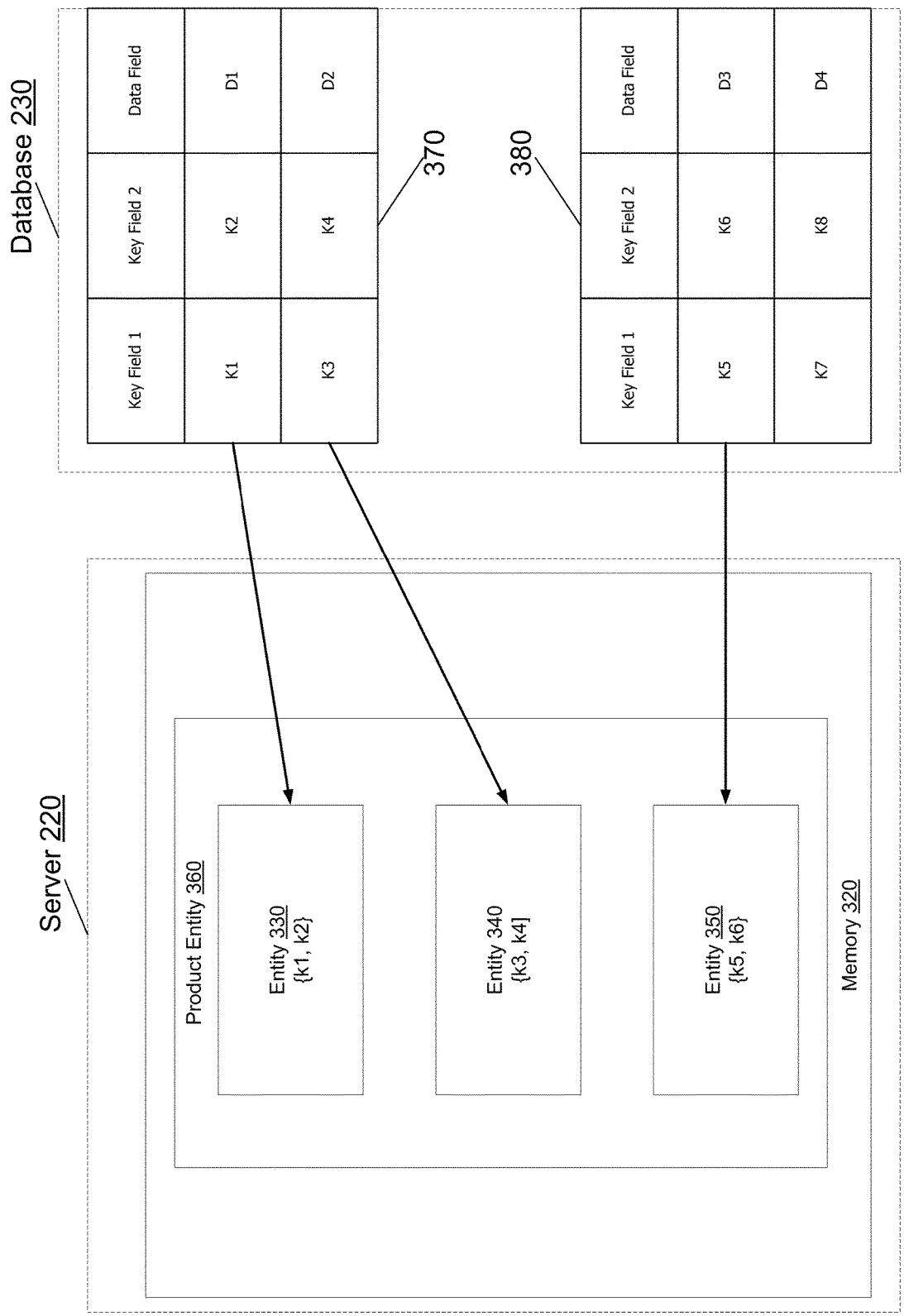
FIG. 3 illustrates a server and a database of a product management system according to an embodiment of the invention.

FIG. 3 illustrates a server and a database of a product management system according to an embodiment of the invention. FIG. 3 illustrates the interaction between server 220 and database 230 of the product management system described in FIG. 2 in more detail. Specifically, according to the embodiment of the invention, server 220 includes memory 320. Memory 320 is configured to store computer readable data structures and instructions. A computer readable data structure can be used to store logically-related data and instructions. Memory 320 can be RAM, flash memory, ROM, EPROM, EEPROM, registers, hard disk, a removable disk, a compact disk read-only memory CD-ROM, or any other form of memory known in the art.

According to the embodiment, memory 320 includes entities 330, 340, and 350, and product entity 360. An entity is a computer readable structure which includes data from database 230 logically organized to represent a database table row of database 230, and which includes instructions defining all business logic and behavior of the entity. Entities 330, 340, and 350 are examples of an entity that represents product information, whereas product entity 360 is an example of an entity that represents a product. As illustrated in FIG. 3, a product entity generally includes one or more entities within the product entity. Thus, product entity 360 includes entities 330, 340, and 350, and entities 330, 340, and 350 represent information relating to the specific product represented by product entity 360.

Furthermore, according to the embodiment of the invention, database 230 includes database tables 370 and 380. A database table, as understood by one of skill in the art, contains a set of data logically sorted in a series of rows, where each row represents a record of the database table. Each database table row include a set of fields, and each field can include a value or a set of values. In the illustrated embodiment of FIG. 3, database 230 includes two database tables (i.e., database tables 370 and 380), database tables 370 and 380 each contain three rows, where each row contains three fields. However, this is merely an example embodiment, and the database of the product management system can include any number of database tables, each database table can include any number of rows, and each row can include any number of fields.

Each entity stored in memory 320 of server 220 corresponds to one or more rows of a database table of database 230. According to an embodiment of the invention, one or more rows can be queried from a database table of database 230 and stored in an entity residing in memory 320 of server 220. In the illustrated embodiment of FIG. 3, the second row of database table 370 is loaded into entity 330 of server 220, the third row of database table 370 is loaded into entity 340 of server 220, and the second row of database table 380 is loaded into entity 350 of server 220. Thus, the data stored in entities 330, 340, and 350 corresponds to the data stored in the second row of database table 370, the third row of database table 370, and the second row of database table 380, respectively. An entity definition indicates which entity is mapped to which database table, and entity keys (i.e., primary and alternate keys) can be mapped to database table keys (i.e., primary and alternate keys). Thus, in the illustrated embodiment, entity 330 includes entity keys k1 and k2 which are mapped to database table keys K1 and K2, entity 340 includes entity keys k3 and k4 which are mapped to database table keys K3 and K4, and entity 350 includes entity keys k5 and k6 which are mapped to database table keys K5 and K6. However, according to an embodiment, the mapping can be accomplished by using primary keys only. As previously discussed, product entity 360 includes entities 330, 340, and 350, and thus, product entity 360 includes data that corresponds to the data stored in the second row of database table 370, the third row of database table 370, and the third row of database table 380.

Similarly, each entity stored in memory 320 of server 220 can be stored in database 230. When an entity is stored in database 230, the data stored in the entity is written to the corresponding one or more rows of the database table of database 230. If the entity being stored in database 230 did not previously exist in database 230, then one or more corresponding rows are inserted in to the appropriate database table of database 230. If the entity is marked for deletion in server 220, then the corresponding one or more database table rows are deleted from database 230. If the entity previously existed in database 230, but the entity contains modified data as compared to the corresponding one or more rows of the database table of database 230, then the corresponding one or more database table rows are updated accordingly.

In an embodiment of the invention, the product management system illustrated in FIGS. 2 and 3 implement an Oracle ADF. ADF includes a Business Components layer (which represents a model layer in an MVC design pattern) which provides a library of reusable software components used to provide data access, domain validation, and business logic. In this embodiment, all data is queried from database 230 using View Objects and the data is loaded into memory 320 using Entity Objects. A View Object is an Oracle ADF component that encapsulates a Structured Query Language ("SQL") query. Because of the encapsulation, a View Object allows the results of the SQL query to be manipulated as an object that can be stored in memory 320. An Entity Object is an ADF component that represents a row in a specified data source, and includes business logic and business rules encapsulated within the entity. While the implementation details described in this embodiment are specific to ADF, one of ordinary skill in the art would readily appreciate that the implementation details can be implemented in other systems, and that in an alternative embodiment, the product management system can implement alternate MVC frameworks. Thus, other embodiments of the invention are not limited to ADF.

Figure 4:
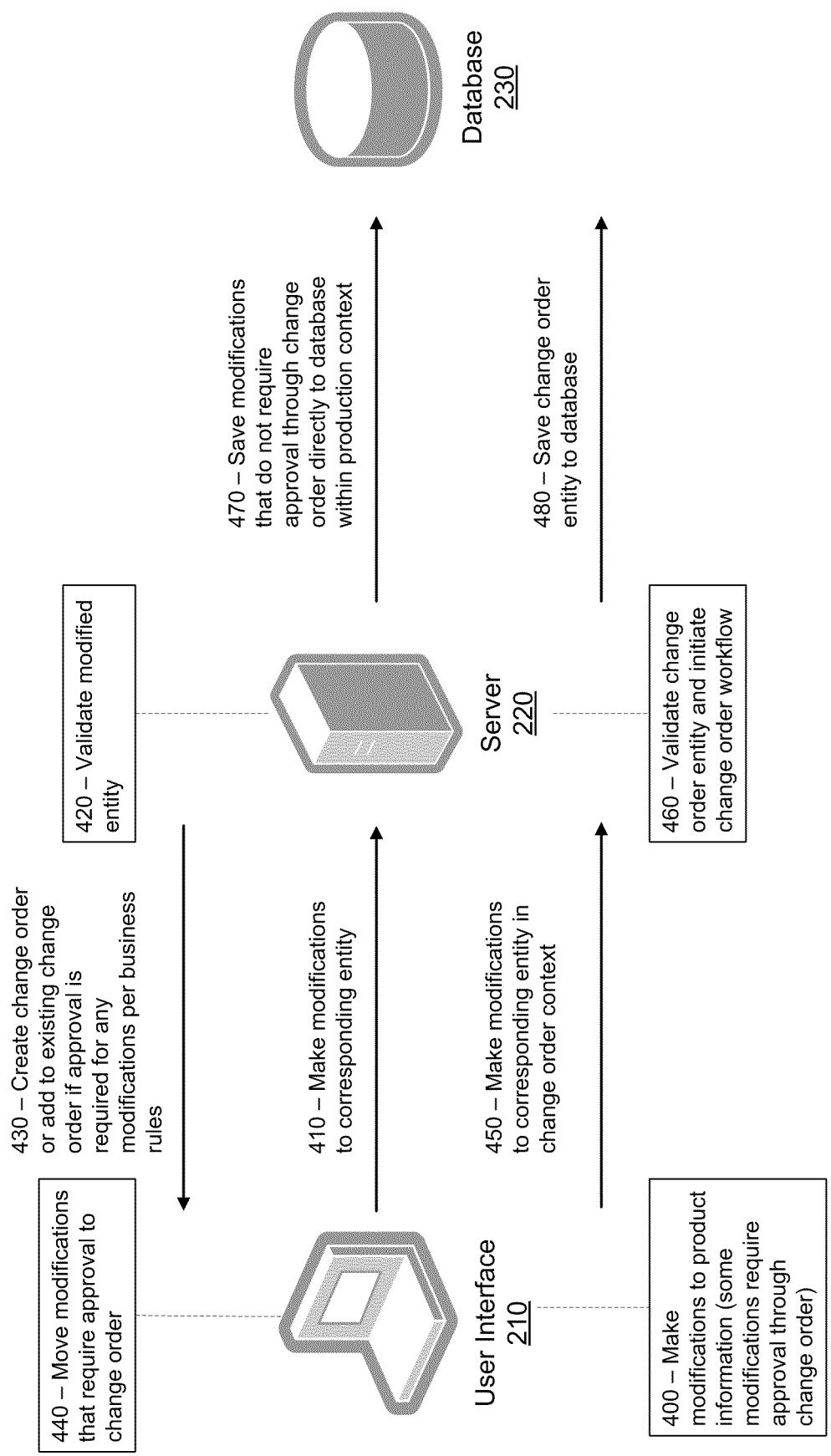
FIG. 4 illustrates a sequence diagram of saving product management system modifications based on business rules to a change order according to an embodiment of the invention.

FIG. 4 illustrates a sequence diagram of saving product management system modifications based on business rules to a change order according to an embodiment of the invention. According to the embodiment of the invention, product information related to a product is retrieved from database 230, one or more entities representing the product, including product information, are created and stored on server 220, and the product, including product information, is displayed to a user at user interface 210 in a production context. What is meant by a "production context", is that, in one embodiment, the product information displayed to the user is the same as the product information stored in database 230. The sequence diagram illustrated in FIG. 4 illustrates how a user makes modifications to the product information, and saves the modifications in the product management system, where some of the modifications require approval.

At 400, the user makes one or more modifications to the product information of the product using user interface 210. As previously discussed, some modifications require approval before they can be saved to database 230. The user then saves the transaction using user interface 210. In this embodiment, the user does not impose any qualifications on its save transaction command. In other words, the user does not indicate whether the modifications made during the transaction should be saved to database 230 or saved in a change order. Alternative, as described in more detail in relation to the embodiment illustrated in FIG. 5, a user may also save all the modifications to a change order context by manually selecting to save the modifications to a change order. While a change order is utilized in the illustrated embodiment, one of ordinary skill in the art would readily appreciate than a change order is an example of a change management system, and that any change management system known in the art can be utilized, and still be within the scope of the invention. Thus, the product management system attempts to save the modification directly to database 230, as will be discussed in more detail.

At 410, user interface 210 transmits the modifications to the product information to server 220, and server 220 makes the modifications to the corresponding one or more entities. These modifications can include creating one or more new entities or modifying one or more attributes of one or more existing entities. Any new entities are marked as new entities, and any modified entities are marked as modified, so that they can be validated by server 220.

At 420, server 220 validates all new entities and modified entities. Validation is the process of determining whether a new entity or a modified entity complies with the business logic that governs the entity. For example, a business rule may exist that a price cannot be greater than 500 of the relevant currency. Therefore, a price entity with a price greater than 500 would fail validation, and the product management system would not allow the price entity to be written to database 210. The validation can also be based on the specific change. For example, a business rule may exist that a price change that is more than 10% of the original price is not allowed. Therefore, a modified price entity with a modified price that is more than 10% of the original price would also fail validation. According to the embodiment of the invention, at 420, server 220 also validates the new entities and modified entities to determine whether any modifications require approval through a change order. Determining whether any modifications required approval can be accomplished through business logic that is a part of each entity. In the embodiment, server 220 determines that some of the modifications to the production information do require approval through a change order.

At 430, a window is displayed at user interface 210 allowing the user to select whether to create a new change order or add to an existing change order, if approval is required for any modifications made at 410, per one or more business rules. If the user selects to create a new change order, server 220 creates a new change order entity and displays the new change order at user interface 210 to allow the user to edit the new change order and save the change order. If the user selects to add to an existing change order, then, after the user provides information to identify the existing change order, server 220 retrieves the existing change order from database 230, makes the corresponding modifications to entities in change order context at server 220, and saves the change order with the revised items carrying the changes. This process is discussed in relation to FIGS. 6, 14, 15, 16, 17, and 18 in greater detail. In an alternate embodiment, the product management system does not display the new or existing change order at user interface 210, and proceeds directly to 440.

At 440, the modifications that require approval are moved into the change order. At 450, interface 210 transmits the change order to server 220, and server 220 makes the modifications to the corresponding entity in a change order context. These modifications can include creating a change order entity, in the embodiment where the user selected to create a new change order, or these modifications can include or modifying an existing change order entity, in the embodiment where the user selected to add to an existing change order. The change order entity is marked as either new or modified, so that the change order entity can be validated by server 220.

At 460, server 220 validates the change order entity. As previously described, server 220 determines that the change order entity complies with the business logic that governs the change order entity. Once the change order entity is validated and saved to database 230 along with revised items carrying the modifications requiring approval (described in more detail in relation to 480), server 220 saves the change order (described in more detail in relation to 480). When the user submits the change order, server 220 initiates a change order workflow. A change order workflow is a series of one or more steps for processing the change order. The series of one or more steps includes sending the change order for a process, such as review or approval, receiving the approval for the change order, and scheduling the modifications once the approval has been received, and on completion, when the effectivity dates are reached for each modification, copying these modifications to production data. An effectivity date is a scheduled date for a modification to go into production.

At 470, after server 220 validates the change order entity, server 220 saves the modifications that do not require approval to database 230. Therefore, according to the embodiment, modifications that do not require approval are sent directly to database 230 within the production context. At 480, server 220 saves the change order entity which includes the modifications that do require approval, grouped under revised items that are part of the change order entity, to database 230. While the change order entity is saved to the database, the modifications that do require approval are not saved to database 230, according to the embodiment. Instead, the project management system must first process the change order before the modifications that do require approval are saved to database 230.

Figure 5:
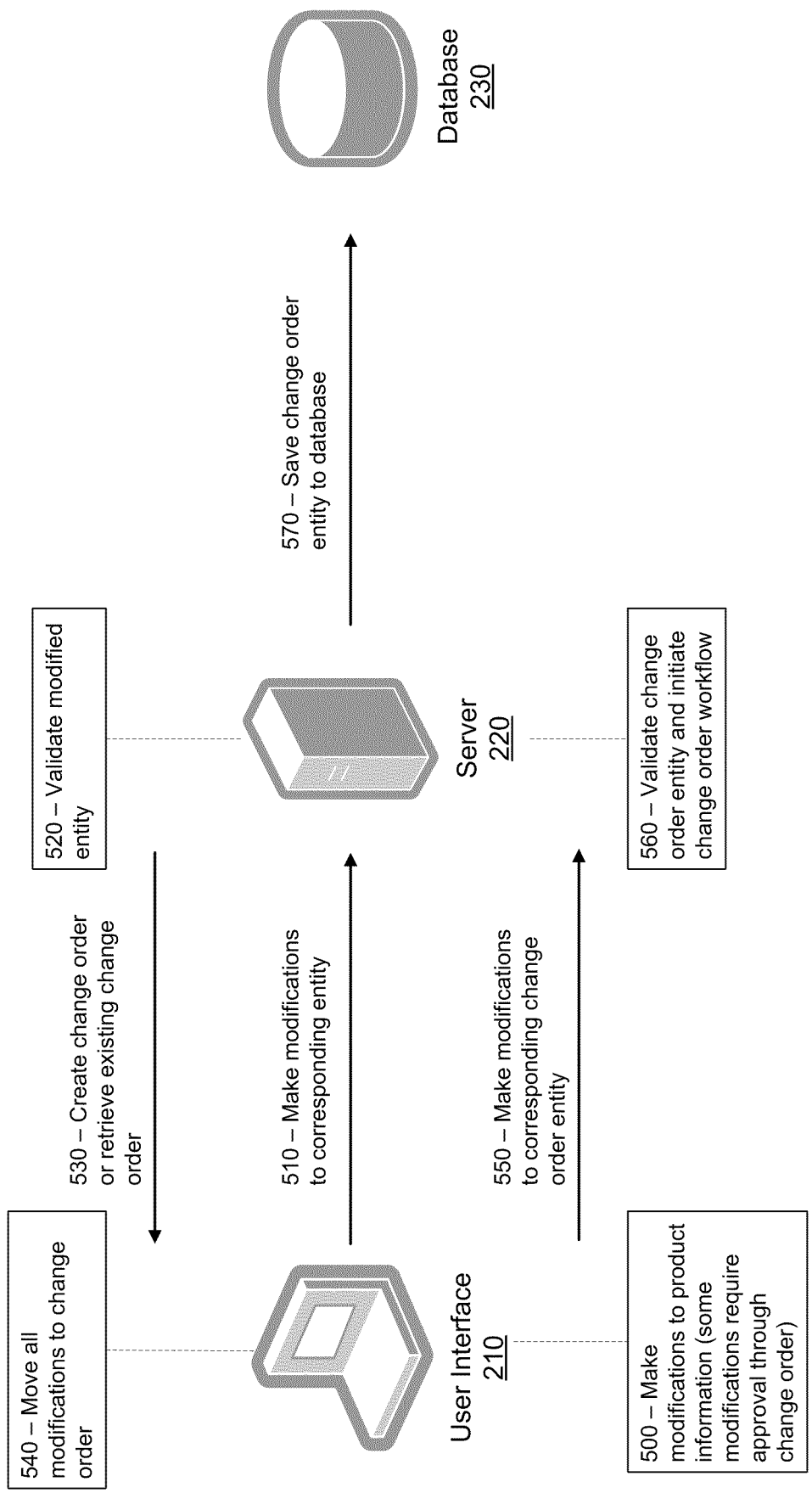
FIG. 5 illustrates a sequence diagram of a user manually saving product data modifications to a change order according to an embodiment of the invention.

FIG. 5 illustrates a sequence diagram of a user manually saving product data modifications to a change order according to an embodiment of the invention. The sequence diagram illustrated in FIG. 5 illustrates how a user makes modifications to the product information, and saves the modifications in the product management system. The sequence diagram illustrated in FIG. 5 differs from the sequence diagram illustrated in FIG. 4, in that the user selects to save all the modifications to a change order, regardless of whether any of the modifications require approval.

At 500, the user makes one or more modifications to the product information of the product using user interface 210. As previously discussed, some modifications require approval through a change order before they can be saved to database 230 within a production context. The user then saves the transaction using user interface 210. In this embodiment, the user indicates that the product management system should save all the modifications in a change order, regardless of the fact that some modifications do not require approval. Thus, in this embodiment, the product management system does not attempt to save the modifications directly to database 230, as will be discussed in more detail.

At 510, user interface 210 transmits the modifications to the product information to server 220, and server 220 makes the modifications to the corresponding one or more entities. These modifications can include creating one or more new entities or modifying one or more attributes of one or more existing entities. Any new entities are marked as new entities, and any modified entities are marked as modified, so that they can be validated by server 220.

At 520, server 220 validates all new entities and modified entities, as described in relation to FIG. 4. According to the embodiment of the invention, server 220 is not required to validate the new entities and modified entities to determine whether any modifications require approval through a change order, because all the modifications will be saved in a change order.

At 530, a window is displayed at user interface 210 allowing the user to select whether to create a new change order or retrieve an existing change order. If the user selects to create a new change order, server 220 creates a new change order entity and displays the new change order at user interface 210 to allow the user to edit the new change order and save the change order. If the user selects to add to an existing change order, then, after the user provides information to identify the existing change order, server 220 retrieves the existing change order from database 230, creates the corresponding change context entities grouped under revised items at server 220, and displays the existing change order at user interface 210 to allow the user to edit the existing change order after the change order is saved to database 230. This process is discussed in relation to FIGS. 6, 14, 15, 16, 17, and 18 in greater detail. In an alternate embodiment, the product management system does not display the new or existing change order at user interface 210, and proceeds directly to 540.

At 540, all the modifications are moved into the change order. At 550, user interface 210 transmits the change order to server 220, and server 220 makes the modifications to the corresponding change order entity. These modifications can include creating a change order entity, in the embodiment where the user selected to create a new change order, or these modifications can include or modifying an existing change order entity, in the embodiment where the user selected to add to an existing change order. The change order entity is marked as either new or modified, so that the change order entity can be validated by server 220.

At 560, server 220 validates the change order entity. As previously described, server 220 determines that the change order entity complies with the business logic that governs the change order entity. Once the change order is verified and saved along with revised items carrying the user modifications in a change context, the user may submit the change order, and then server 220 can initiate a change order workflow. A change order workflow is a series of one or more steps for processing the change order. The series of one or more steps includes reviewing the change order, receiving the required approval for the change order and saving the modifications of the change order to the database once the required approval has been received.

At 570, server 220 saves the change order entity to database 230. While the change order entity is saved to a production context, the modifications are not saved to database 230, according to the embodiment. Instead, the project management system saves the modifications against revised items inside the change order, and then processes the change order before the modifications are saved to the production context.

Figure 6:
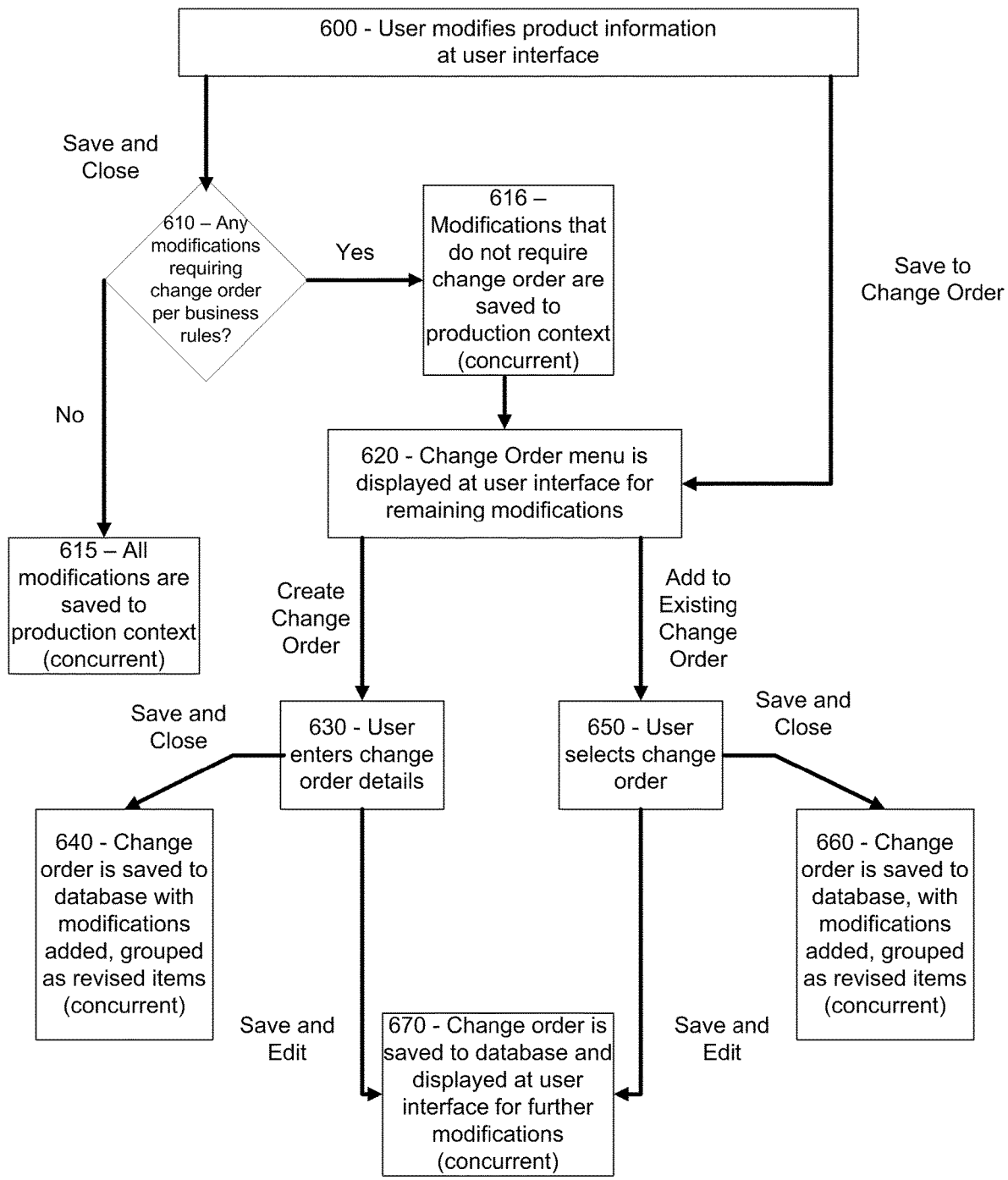
FIG. 6 illustrates a sequence diagram of a user saving product information modifications using a user interface according to an embodiment of the invention.

FIG. 6 illustrates a sequence diagram of a user saving product information modifications using a product management system according to an embodiment of the invention. As previously described, in a product management system according to an embodiment of the invention, a user can choose whether all product information modifications should be saved in a change order.

Figure 13:
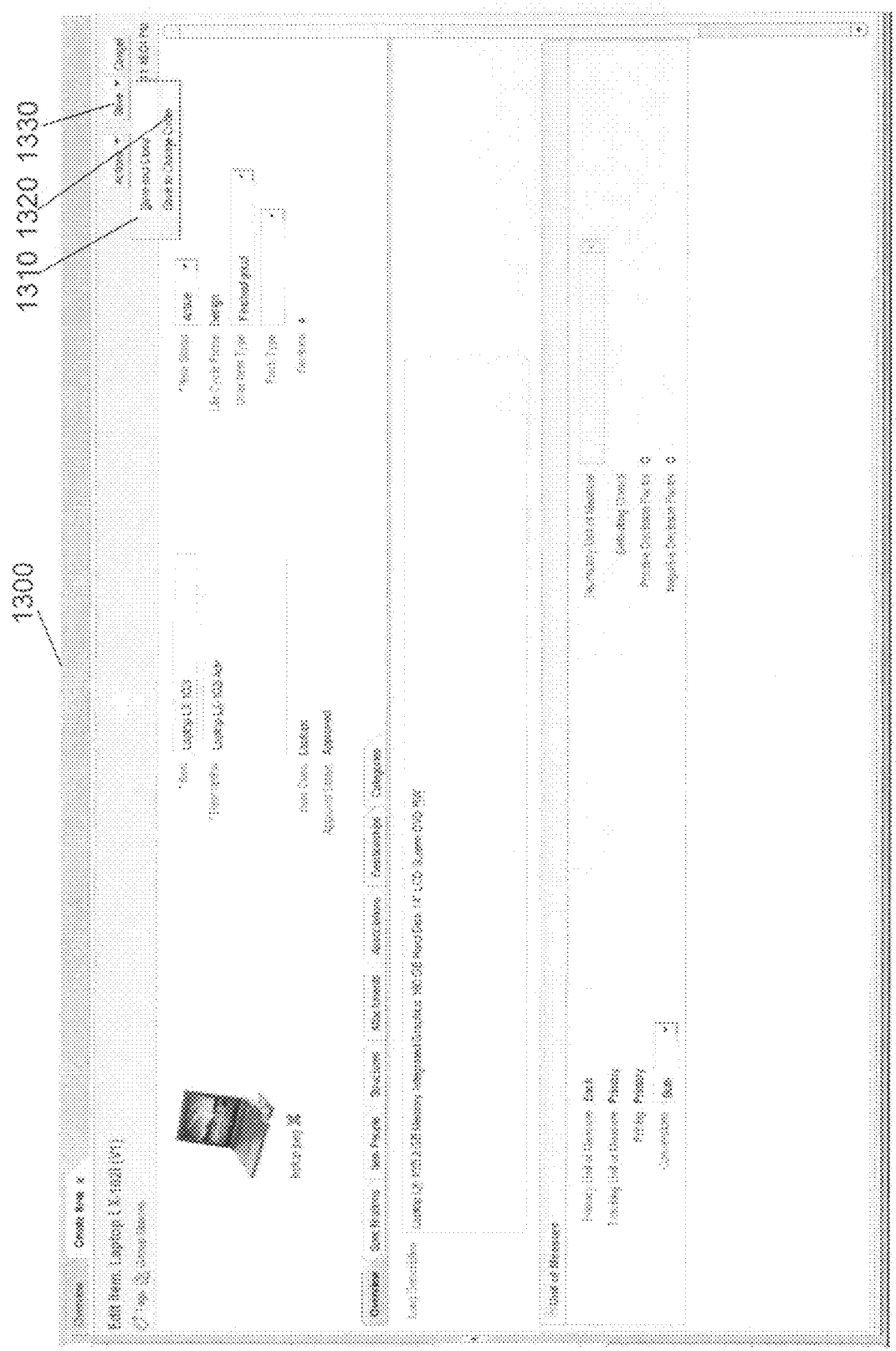
FIG. 13 illustrates a user interface for modifying product information, which depicts two save options according to an embodiment of the invention.

At 600, a user modifies product information at a user interface of a product management system, as previously described in relation to FIGS. 4 and 5. After a user modifies product information, the user interface has three commands, "Save", "Save and Close" and "Save to Change Order." As will be described in more detail, the user interface gives the user a choice to either attempt to save all changes to the database, or to save all changes to a change order. The two commands, "Save and Close" and "Save to Change Order," of the user interface are also illustrated in FIG. 13 which will also be discussed in more detail.

If a user selects the command "Save and Close," then, at 610, the modifications of the user are validated to determine whether any modifications require approval through a change order. After validation, if none of the modifications require approval, then, at 615, all modifications are saved to the production context. However, after validation, if one or more modifications require approval, then, at 616, the modifications of the user that do not require approval are saved to the production context. At 620, a change order menu is displayed at the user interface for the remaining modifications that require approval. Furthermore, if the user selects the command "Save to Change Order," rather than "Save and Close," then the product management system proceeds directly to 620, skipping 610, and a change order menu is displayed at the user interface for all modifications.

Figure 14:
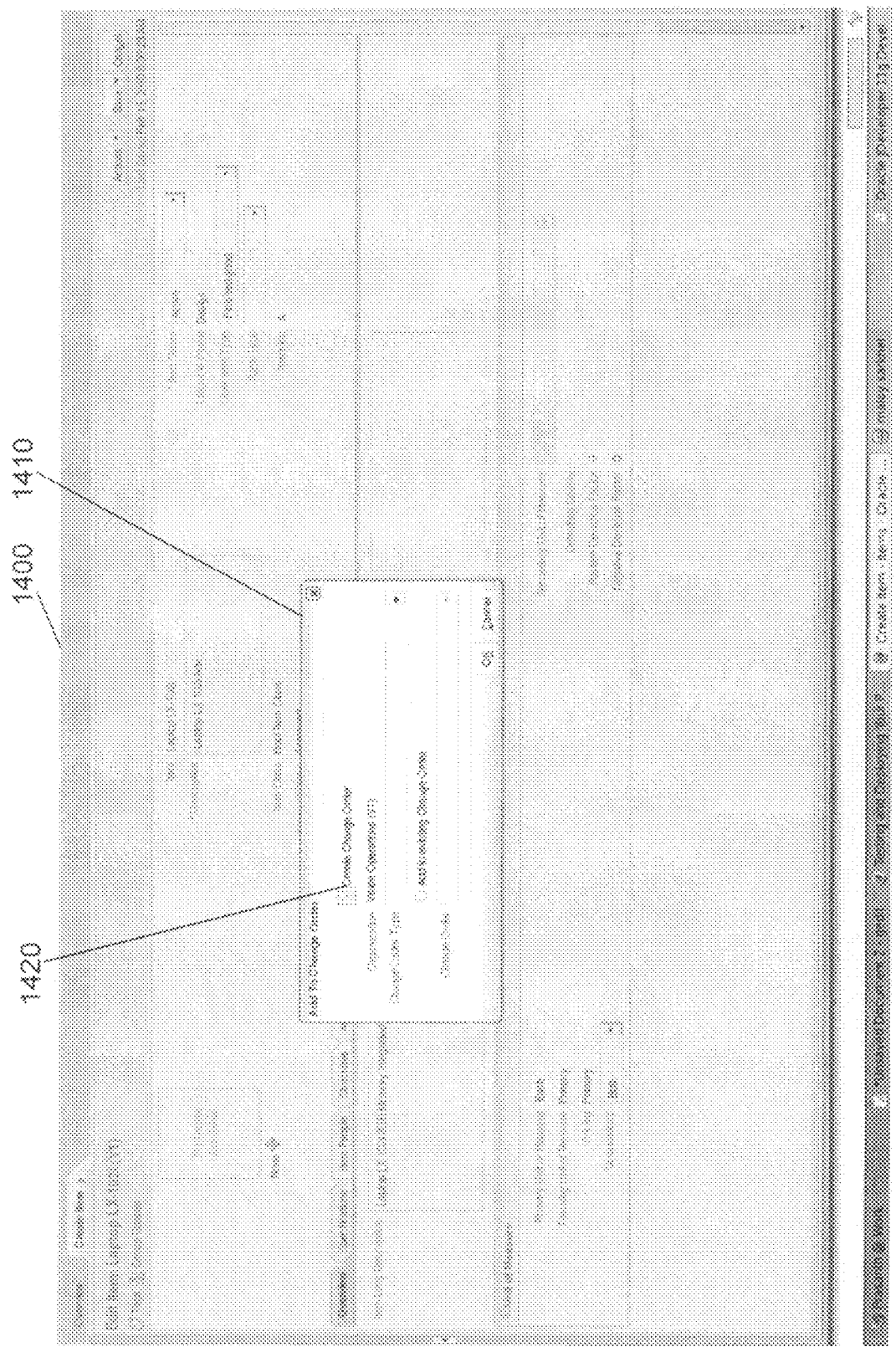
FIG. 14 illustrates a user interface for saving product information modifications to a change order according to an embodiment of the invention.
Figure 15:
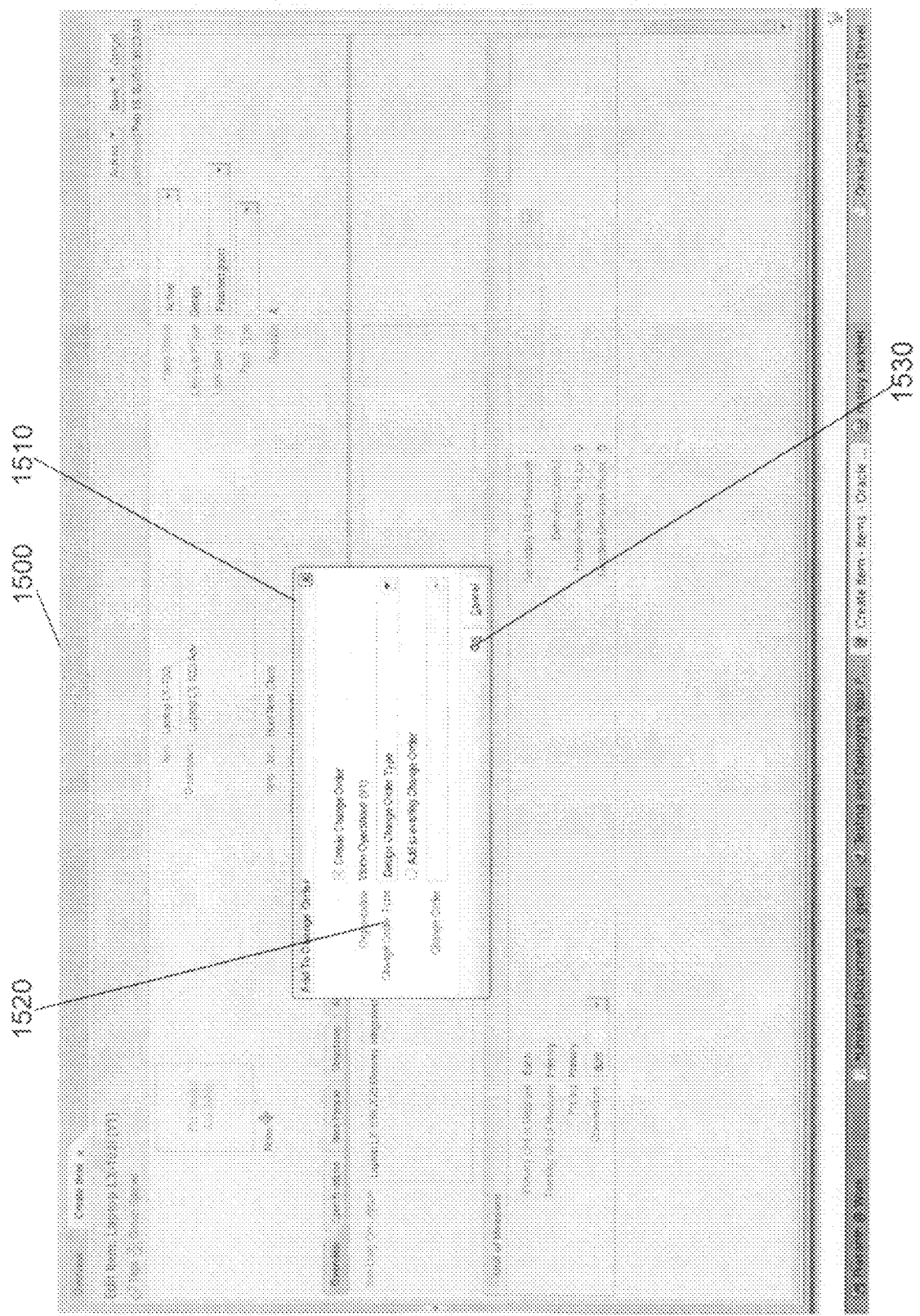
FIG. 15 illustrates another user interface for saving product information modifications to a new change order according to an embodiment of the invention.
Figure 18:
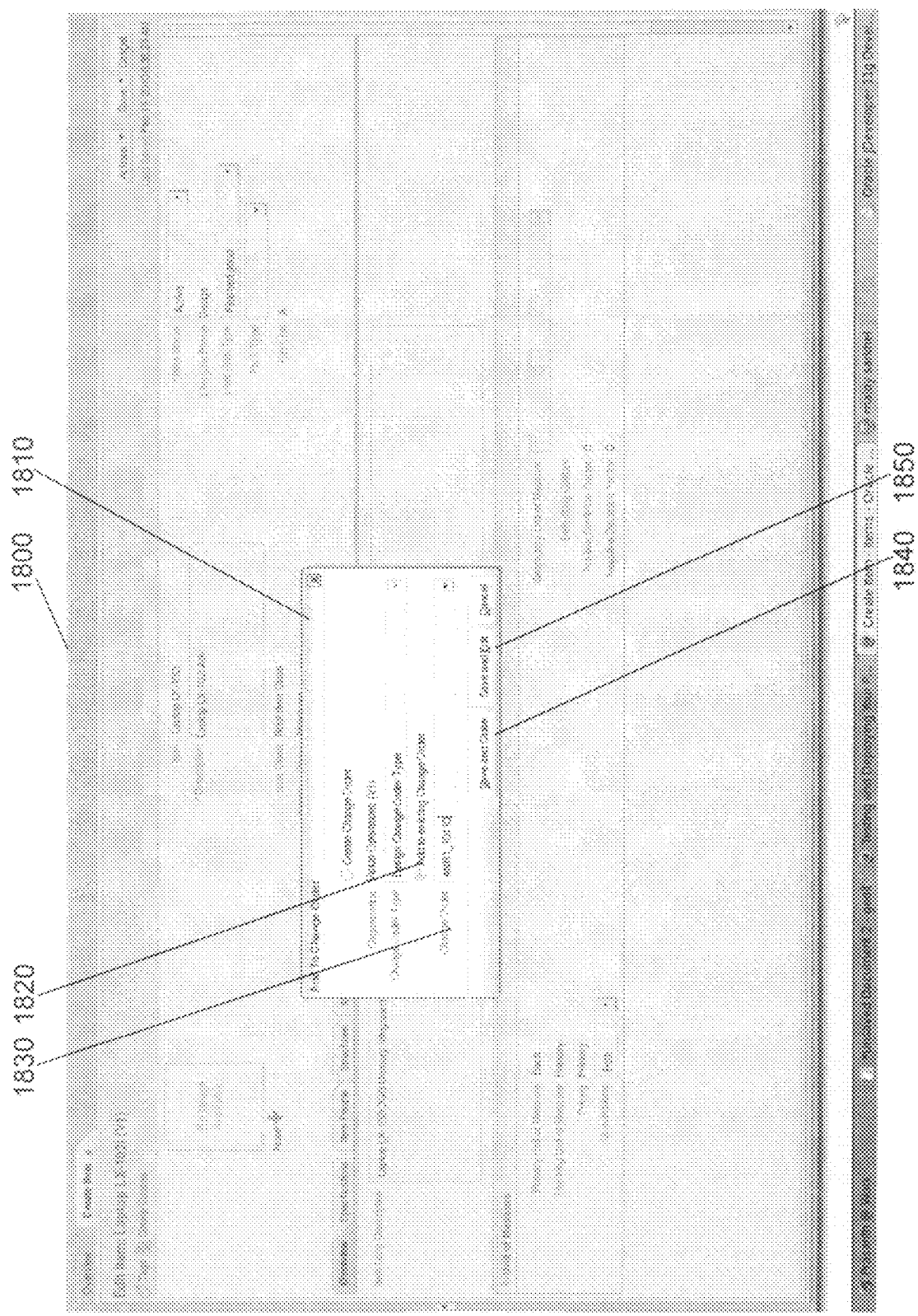
FIG. 18 illustrates a user interface for saving product information modifications to an existing change order according to an embodiment of the invention.

In the change order menu displayed at the user interface at 620, the user interface also displays two commands from which the user can select "Create Change Order," and "Add to Existing Change Order." The two commands of the user interface are also illustrated in FIGS. 14, 15, and 18, which will be discussed in more detail. The command "Create Change Order" creates a new change order where the product management system will move the modifications under revised items which are added to the change order. The command "Add to Existing Change Order" will select an existing change order where the product management system will move the modifications.

Figure 16:
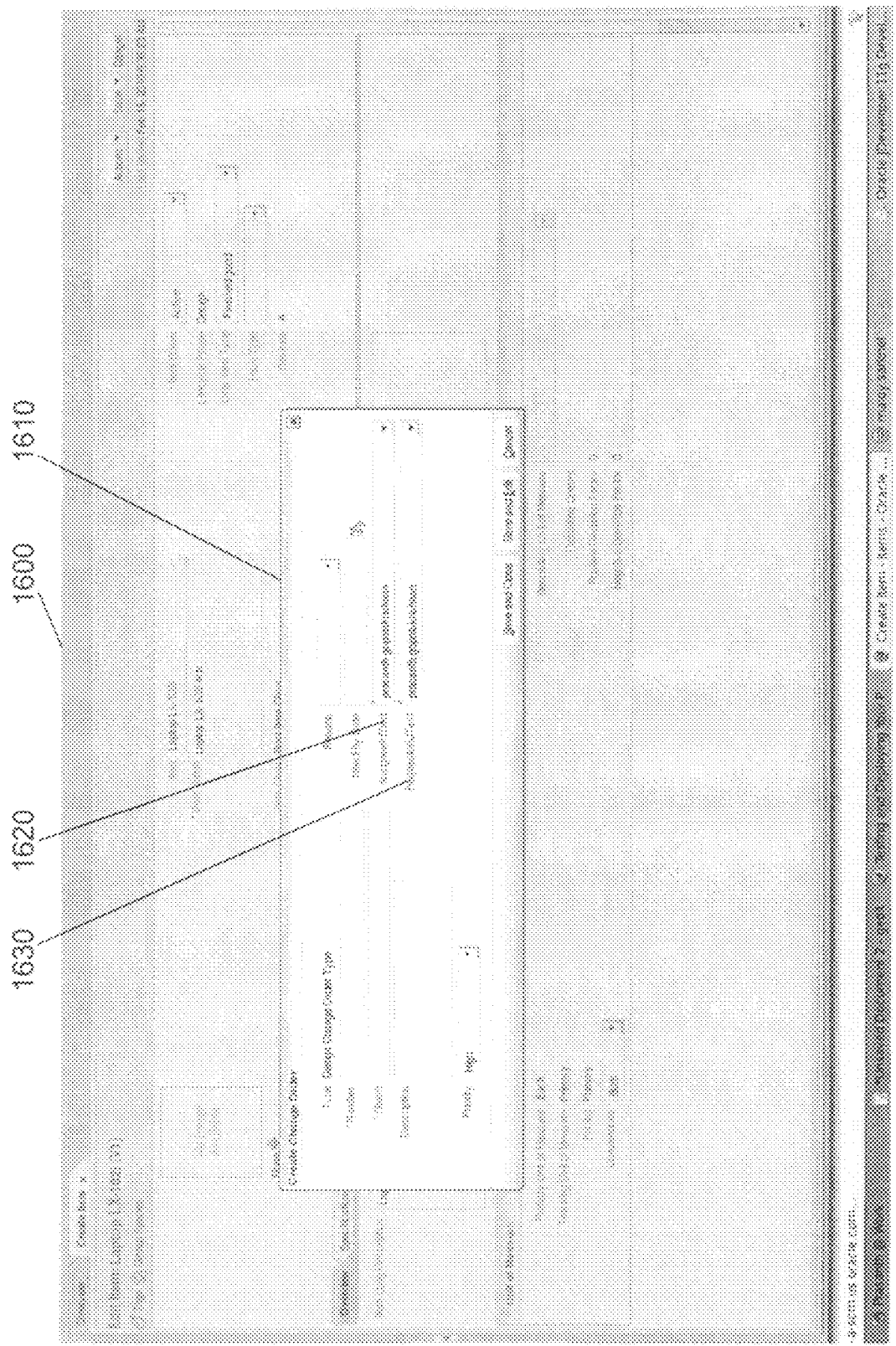
FIG. 16 illustrates a user interface for creating a change order according to an embodiment of the invention.
Figure 17:
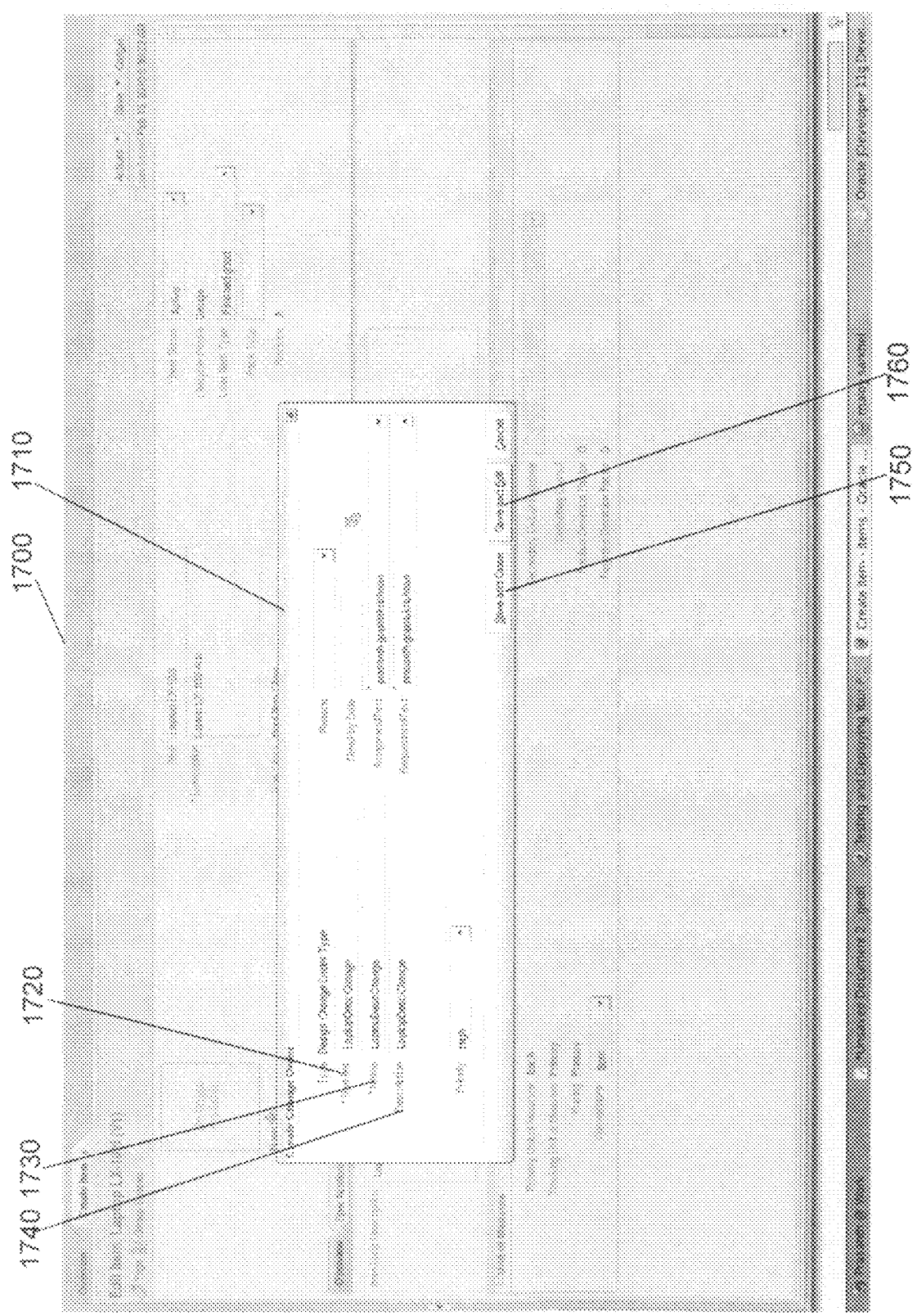
FIG. 17 illustrates a user interface for creating a change order with details entered according to an embodiment of the invention.

If the user selects the command "Create Change Order," then, at 630, the user interface displays fields which allow the user to enter change order details so that the product management system can create the change order. For example, the user can enter a value for the following details using the user interface: type, reason, name, description, priority, reason, need by date, assignee identity, and requestor identity. The fields displayed by the user interface are also illustrated in FIGS. 15, 16, and 17, which will be discussed in more detail. After the user enters the desired values for the change order details, the user interface displays two commands "Save and Close," and "Save and Edit." The "Save and Close" command indicates that the user does not wish to further modify the change order, the change order is created, the modifications are moved to the change order, the change order is saved to the database, and the previous window displayed by the user interface is closed. The "Save and Edit" command indicates that the user does wish to further modify the change order, the change order is created, the modifications are moved to the change order, the change order is saved to the database, and a new window is displayed by the user interface that allows the user to further modify the newly created change order. The commands displayed by the user interface are also illustrated in FIGS. 17 and 18, which will also be discussed in more detail.

If the user selects the "Save and Close" command, then, at 640, the newly created change order is saved to the database after the modifications are moved to the change order. The window displayed by the user interface is also closed, and the user cannot further modify the change order without navigating back to the change order menu. If the user selects the "Save and Edit" command, then the product management system proceeds to 670, which will be discussed in more detail.

Back at the change order menu displayed at the user interface at 620, if the user selects the "Add to Existing Change Order" command, then, at 650, the user selects an existing change order to move the modifications to. As an example, the user can enter the name of an existing change order in a field. As another example, the user can select the existing change order from a drop-down menu or list of values of existing change orders. After the user selects the existing change order, the user interface displays two commands "Save and Close," and "Save and Edit." The "Save and Close" command indicates that the user does not wish to further modify the existing change order, the modifications are moved to the existing change order, the existing change order is saved to the database, and the previous window displayed by the user interface is closed. The "Save and Edit" command indicates that the user does wish to further modify the existing change order, the modifications are moved to the existing change order, the existing change order is saved to the database, and a new window is displayed by the user interface that allows the user to further modify the existing change order. The commands displayed by the user interface are also illustrated in FIGS. 17 and 18, which will also be discussed in more detail.

If the user selects the "Save and Close," command, then, at 660, the existing change order is saved to the database after the modifications are moved to the change order. The window displayed by the user interface is also closed, and the user cannot further modify the existing change order without navigating back to the change order menu. If the user selects the "Save and Edit" command, then the product management system proceeds to 670.

Figure 19:
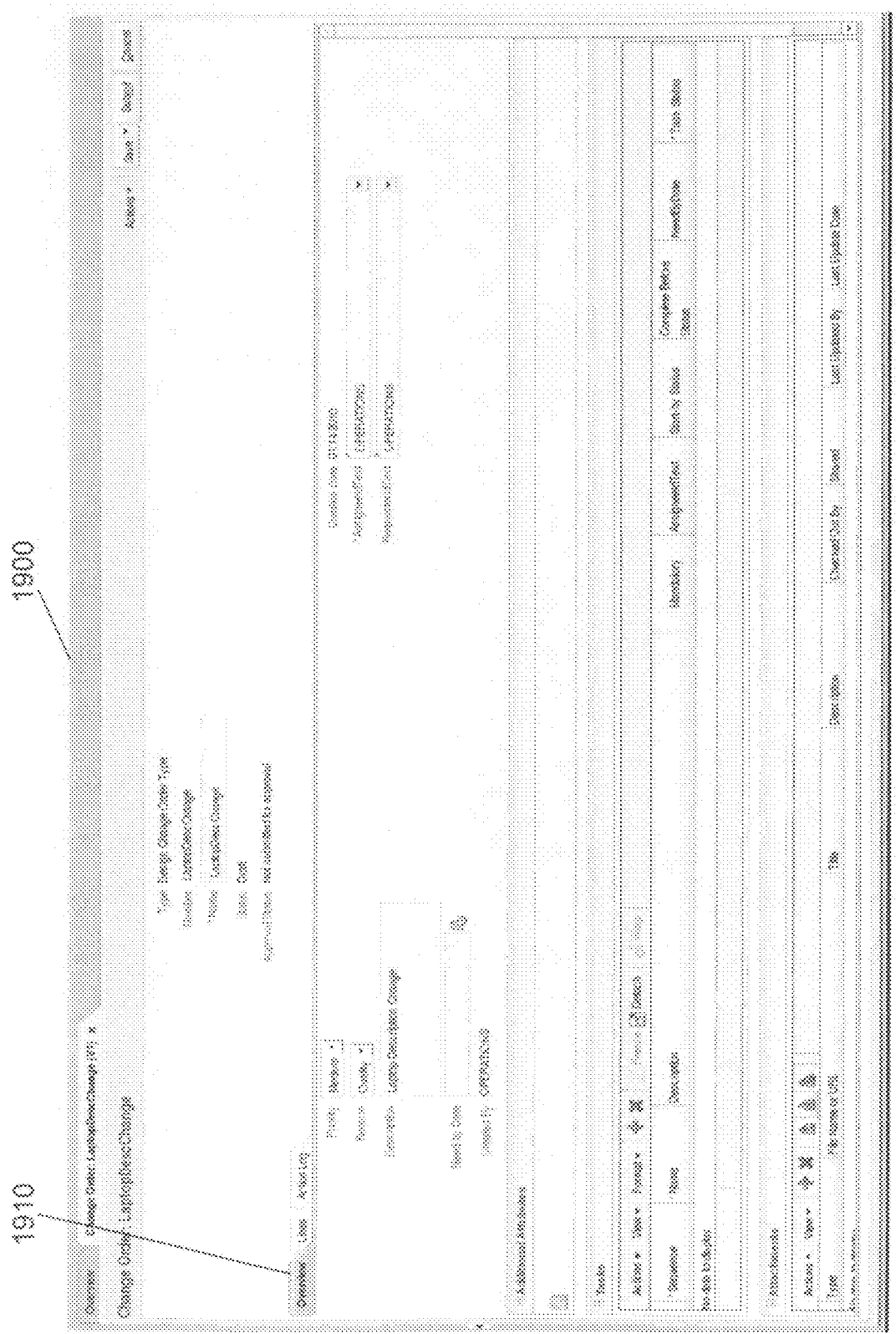
FIG. 19 illustrates a user interface for displaying an editable view of a change order according to an embodiment of the invention.

At 670, the change order (either the newly created change order or the existing change order) is saved to the database after the modifications are moved to the change order. Rather than closing the window, the user interface displays a window that allows a user to further modify a change order. This window is illustrated in FIG. 19, which will be discussed in more detail. In this window, a user can make further modifications to the change order before saving the change order. When the user saves the change order, the product management system will validate the change order and, if the change order passes validation, the product management system will save the change order, and its revised items which consolidate the modifications, to the database. In the illustrated embodiment, all modifications to both production and to change context that occur at 614, 615, 640, 660, and 670 are done concurrently, and thus, 614, 615, 640, 660, and 670 are labeled (concurrent) in FIG. 6 to indicate that the updates are concurrent.

Figure 7:
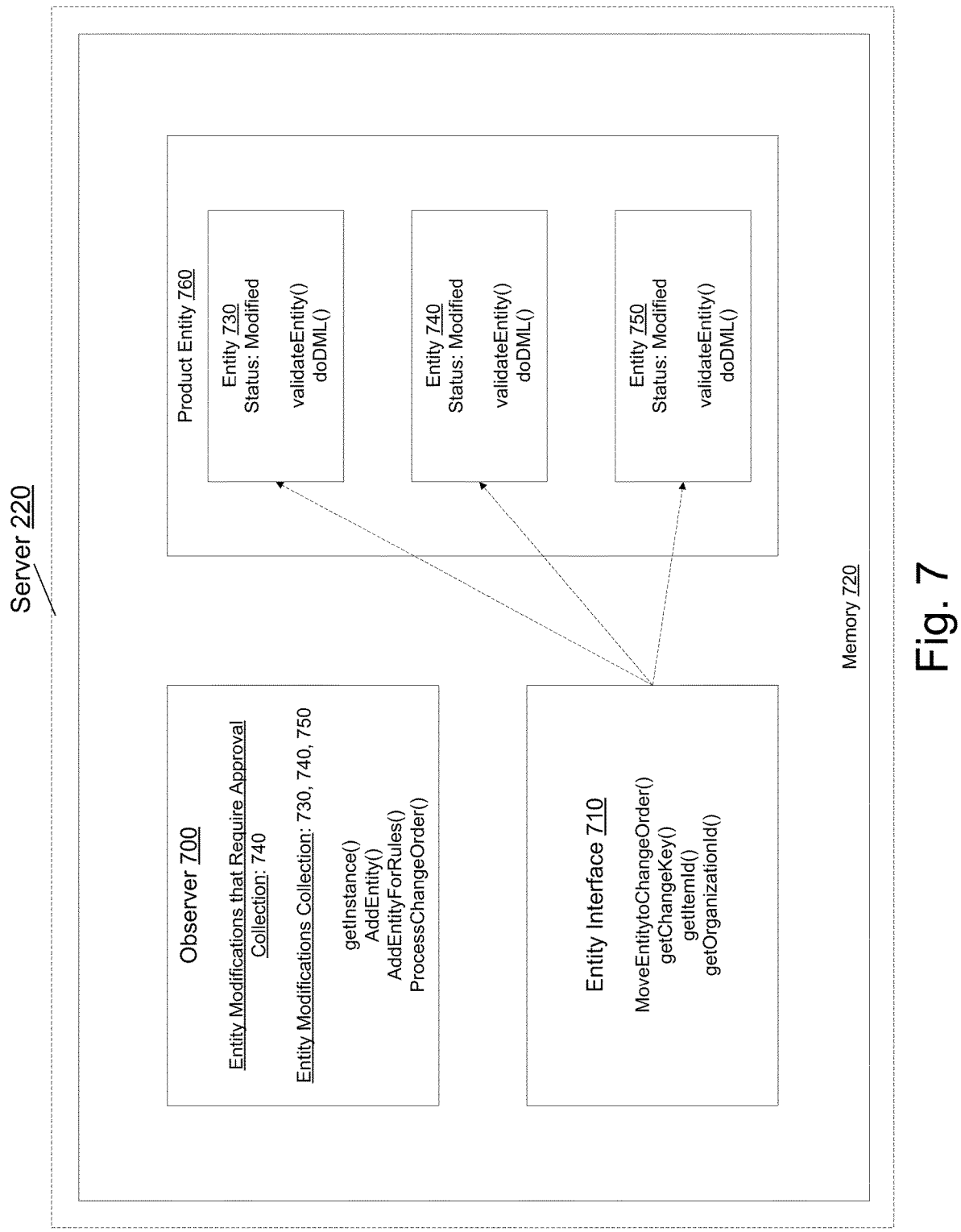
FIG. 7 illustrates an observer collection framework utilized by a product management system according to an embodiment of the invention.

FIG. 7 illustrates an observer collection framework utilized by a product management system according to an embodiment of the invention. The illustrated embodiment includes server 220 of FIG. 2, which includes memory 720. As previously described, server 220 is a component of the product management system configured to store and perform the business logic of the product management system, and to represent the data of the product management system in memory 720. Memory 720 can be comprised of any combination of RAM, ROM, static storage such as a magnetic or optical disk, or any other type of machine or computer-readable medium.

The illustrated embodiment also includes observer 700, entity interface 710, entities 730, 740, and 750, and product entity 760. Observer 700 represents a static class that is a part of the observer collection framework utilized by the product management system according to an embodiment of the invention. Observer 700 can monitor all the entities that are modified by the user. Once a user modifies an entity, observer 700 can add the entity to one or both of its two collections. The first collection is a collection of modified entities whose modifications require approval through a change management system. According to an embodiment of the invention, the change management system can include a change order. The second collection is a collection of all modified entities. By the use of the two collections, observer 700 can separate product modifications that require an approval from product modifications that do not require an approval. Thus, observer 700 can add product modifications that require an approval to a change order, or some other approval mechanism of a change management system, so that the product management system does not process the product modification that requires an approval until the change order, or other approval mechanism, has been approved and processed. In addition, the entities can be removed from the respective collections if an approval is not required or if the modifications are reverted.

Because observer 700 is a static class, its methods are also static as well. A static method is a method that acts at the class level rather than at the instance level. Thus, any of observer 700's methods can be called without first creating an instance of (also known as instantiating) observer 700. However, because the two collections of observer 700 are maintained for each unique product (i.e., item), an instance of observer 700 is created for each unique item. In an embodiment of the invention, the two collections are maintained for each unique item, by assigning each unique item an item identity and an organization identity. An item identity identifies the item as a specific type of item. For example, when an item is an airplane, the item would have an item identity that identifies the item as an airplane item. Likewise, when an item is a laptop, the item would have an item identity that identifies the item as a laptop item. An organization identity identifies the item as being associated with a particular organization. For example, an airplane constructed in an organization in the United States would have a different organization identity then an airplane constructed in the United Kingdom. Thus, each item can be identified by a unique item/organization combination. However, the identification keys can vary based on an embodiment of this invention.

According to the embodiment of the invention, observer 700 includes a set of methods, with the set of methods including the following methods: getInstance( ), AddEntity( ), AddEntityForRules( ), and ProcessChangeOrder( ).

The getInstance( ) method takes as parameters an item identity and an organization identity, and returns an instance of observer 700 for the item associated with the unique item/organization combination. Below is example pseudo-code for the getInstance( ) method of observer 700, according to an embodiment of the invention:

```
public static Observer getInstance(DBTransaction transaction,Long ItemId,Long organizationId)
    {
        synchronized(transaction){
            Observer instance = (Observer)transaction.getSession( ).getUserData( ).get(TRANSACTION_UTIL_INSTANCE_NAME +ItemId+organizationId);
            if(instance==null){
                instance=new Observer( );
                instance.initTransaction(transaction, ItemId,organizationId);
transaction.getSession( ).getUserData( ).put(TRANSACTION_UTIL_INSTANCE_NAME+ItemId+organizationId,instance);
            }
            return instance;
        }
    }
```

The AddEntity( ) method takes as a parameter an entity, and adds the entity to the second collection. Below is example pseudo-code for the AddEntity( ) method of observer 700, according to an embodiment of the invention:

```
public static void addEntity(DBTransaction transaction, Long ItemId,Long organizationId, EntityInterface entity)
    {
        Observer instance=getInstance(transaction,ItemId,organizationId);
        if(instance.processComplete)instance.initTransaction(transaction, ItemId,organizationId);
        //add all entities to allEntityCollectionForRules collection based on the rule entity name
        if(!instance.allEntityCollectionForRules.containsKey(entity.getRuleEntityName( ))){
            HashMap entityList=new HashMap( );
            entityList.put(entity,null);
instance.allEntityCollectionForRules.put(entity.getRuleEntityName( ),entityList);
        }else{
if(!((HashMap)instance.allEntityCollectionForRules.get(entity.getRuleEntityName( ))).containsKey(entity)){
((HashMap)instance.allEntityCollectionForRules.get(entity.getRuleEntityName( ))).put(entity,null);
            }
        }
        if(entity.handlesOwnRevisedEntityAssociation( ))
        {
            instance.excludedEntities.put(entity,null);
        }else if(!instance.entitiesToRevItemReverseMap.containsKey(entity)){
            HashMap keyAttrs=entity.getKeyAttrs(EntityInterface.CHANGE_KEY);
            //grouping modified entities to revised items based on date, item, org, version, etc.
            keyAttrs=instance.findMatchingRevisedLineAndAddEntity(keyAttrs,entity);
            instance.entitiesToRevItemReverseMap.put(entity,keyAttrs);
        }
    }
```

The Add EntityForRules( ) method takes as a parameter an entity, and adds the entity to the first collection. Below is example pseudo-code for the Add EntityForRules( ) method of observer 700, according to an embodiment of the invention:

```
public static void addEntityforRules(DBTransaction transaction,Long ItemId,Long
organizationId, EntityInterface entity)
    {
        Observer instance=getInstance(transaction,ItemId,organizationId);
        if(instance.processComplete)instance.initTransaction(transaction,
ItemId,organizationId);
if(!instance.rulesEntitiesRequiringChangeOrder.containsKey(entity.getRuleEntityName( )
)){
        HashMap entityList=new HashMap( );
        entityList.put(entity,null);
instance.rulesEntitiesRequiringChangeOrder.put(entity.getRuleEntityName( ),entityList);
        }else{
if(instance.rulesEntitiesRequiringChangeOrder.get(entity.getRuleEntityName( ))!=null){
if(!(((HashMap)instance.rulesEntitiesRequiringChangeOrder.get(entity.getRuleEntityNam
e( ))).containsKey(entity)){
((HashMap)instance.rulesEntitiesRequiringChangeOrder.get(entity.getRuleEntityName(
))).put(entity,null);
        }
        }else{
        HashMap entityList=new HashMap( );
        entityList.put(entity,null);
instance.rulesEntitiesRequiringChangeOrder.put(entity.getRuleEntityName( ),entityList);
        }//rule entity not found
    }
}
```

The ProcessChangeOrder( ) method takes as a parameter an item identity and an organization identity, adds all entities from the first collection to a change order associated with the revised item associated with the unique item/organization combination, and initiates a workflow for the change order. Below is example pseudo-code for the ProcessChangeOrder( ) method of observer 700, according to an embodiment of the invention:

```
public static void processChangeOrder(DBTransaction transaction, Long
changeId,Long versionId,Long ItemId,Long organizationId)
    {
        Observer instance=getInstance(transaction,ItemId,organizationId);
        if(changeId==null)changeId=instance.getChangeId( );
        if(versionId==null)versionId=instance.getVersionId( );
            if(instance.processComplete || changeId ==null)return;
        if(instance.addToChangeOrderCase){
            for(Object entity:instance.excludedEntities.keySet( ))
            {
                ((EntityInterface)entity).moveEntityToChangeOrder(changeId,null,null,null);
            }
            for(Object entity:instance.entitiesToRevItemReverseMap.keySet( )){
                if(((EntityInterface)entity).handlesOwnRevisedEntityAssociation( )){
((EntityInterface)entity).moveEntityToChangeOrder(changeId,null,null,null);
                }else{
((EntityInterface)entity).moveEntityToChangeOrder(changeId,(Long)instance.getChang
eLine((EntityInterface)entity,changeId).get(VERSION_ID),(Long)instance.getChangeLin
e((EntityInterface)entity,changeId).get(CHANGE_LINE_ID),
(Timestamp)instance.getChangeLine((EntityInterface)entity,changeId).get(EntityInterfac
e.EffectivityDate));
                }
            }
            instance.processComplete=true;
        }else if(instance.rulesEntitiesRequiringChangeOrder.size( )>0)
        {
            //et all hashmaps for all rule entities
            for(Object
ruleEntityName:instance.rulesEntitiesRequiringChangeOrder.keySet( )){
                if(instance.allEntityCollectionForRules.containsKey(ruleEntityName)){
                    //process all the entity for the same rule
                    HashMap allEntitymap
=(HashMap)instance.allEntityCollectionForRules.get(ruleEntityName);
                    if(allEntitymap!=null && allEntitymap.size( ) >0){
                        for(Object entity : allEntitymap.keySet( )){
if(((EntityInterface)entity).handlesOwnRevisedEntityAssociation( )){
((EntityInterface)entity).moveEntityToChangeOrder(changeId,null,null,null);
                        }else{
((EntityInterface)entity).moveEntityToChangeOrder(changeId,(Long)instance.getChang
eLine((EntityInterface)entity,changeId).get(VERSION_ID),
(Long)instance.getChangeLine((EntityInterface)entity,changeId).get(CHANGE_LINE_ID
),
(Timestamp)instance.getChangeLine((EntityInterface)entity,changeId).get(EntityInterfac
e.EffectivityDate));
                        }
                    }
```

```
        }//if map contains rows
      }//rule entity found
    }//get all hashmaps for all rule entities
    instance.processComplete=true;
  }
}
```

Entity interface 710 is an application programming interface configured to allow an entity, such as entities 730, 740, and 750, and such as product entity 760, to interact with an observer, such as observer 700, and vice-versa. Entity interface 710 declares a set of methods that can be implemented by each entity. Entity interface 710 allows for the flexibility of each entity to implement the set of methods in a different manner.

According to the embodiment of the invention, the set of methods includes the following methods: MoveEntityToChangeOrder( ), getChangeKey( ), getItemId( ), and getOrganizationId( ). The MoveEntityToChangeOrder( ) method takes as parameters an identity of the change order, an identity of the change order line (which represents a revised item which includes the modification to the item (i.e., product)) and an effective date which indicates when the modification is to go in effect, once approved. According to the embodiment, the MoveEntityToChangeOrder( ) method can be invoked from the ProcessChangeOrder( ) method of observer 700. According to an embodiment of the invention, if the entity is an existing entity, and the modifications update the existing entity, then a copy of the entity is created, the modifications of the existing entity are extracted from the existing entity and moved to the copy of the entity, and the copy of the entity carrying delta changes is moved to the change order. In an embodiment of the invention, the extraction works on a basis of a bitmap technique, which marks a bit for each attribute modified in the entity. For example, if an entity has attributes A and B, and only attribute A is modified, then the corresponding bitmap will be "10". If the entity is a new entity, and the new entity is marked as requiring approval, then the new entity is moved to the change order. If the entity is an existing entity, and the modifications delete the existing entity, then a copy of the entity is created which includes all the data of the existing entity, and the copy of the entity is marked for deletion. This can be done by marking the copy of the entity with a modification type value of "delete." (Other valid values for the modification type are "update," when the modifications update the existing entity, and "add," when the modifications add a new entity.) The copy of the entity is then moved to the change order. In update and delete cases, the actual entity will be refreshed to a previous database state, and hence, the modifications will not get saved to production context. Newly added rows are also moved to a change context and thus, will not move to a production context.

The getChangeKey( ) method returns the identity of the change order, the identity of the change order line (which represents the revised item that the modification should be associated with), and the effective date. In an embodiment, the getChangeKey( ) method can also return other information to assist in identifying the change order, and change order line, that the modification should be associated with, such as a revision identity or a version identity. The getChangeKey( ) method can be invoked by the AddEntity( ) method of observer 700.

The getItemId( ) method returns the item identity of the entity. Similarly, the getOrganizationId( ) method returns the organization identity of the entity. These methods can be used to select the instance of observer 700 that the entity is associated with.

Entities 730, 740, and 750 are similar to entities 330, 340, and 350 of FIG. 3. Likewise, product entity 760 is similar to product entity 360 of FIG. 3. As shown in FIG. 7, entities 730, 740, and 750, implement the set of methods declared in entity interface 710. According to certain embodiments of the invention, entities 730, 740, and 750 can implement the set of methods differently depending on the type of entity. Entities 730, 740, and 750, each include two additional methods: ValidateEntity( ) and DoDML( ).

The ValidateEntity( ) method validates the entity and ensures that the entity data complies with the business logic of the entity. According to an embodiment of the invention, the ValidateEntity( ) method will also determine whether the modifications associated with the entity require approval. If the modifications do require approval, then the ValidateEntity( ) method will also invoke the Add EntityForRules( ) method of observer 700. Subsequently, regardless of whether the modifications require approval, the ValidateEntity( ) method will also invoke the AddEntity( ) method of observer 700.

The DoDML( ) method performs the data manipulation language ("DML") of the entity, which involves storing the new entity or existing entity's modification to the database, or deleting deleted entity's corresponding row from the database. However, an entity can override this method to avoid entity modifications from being saved to the database, for example, in a situation where the entity is being moved to a change order.

Figure 8:
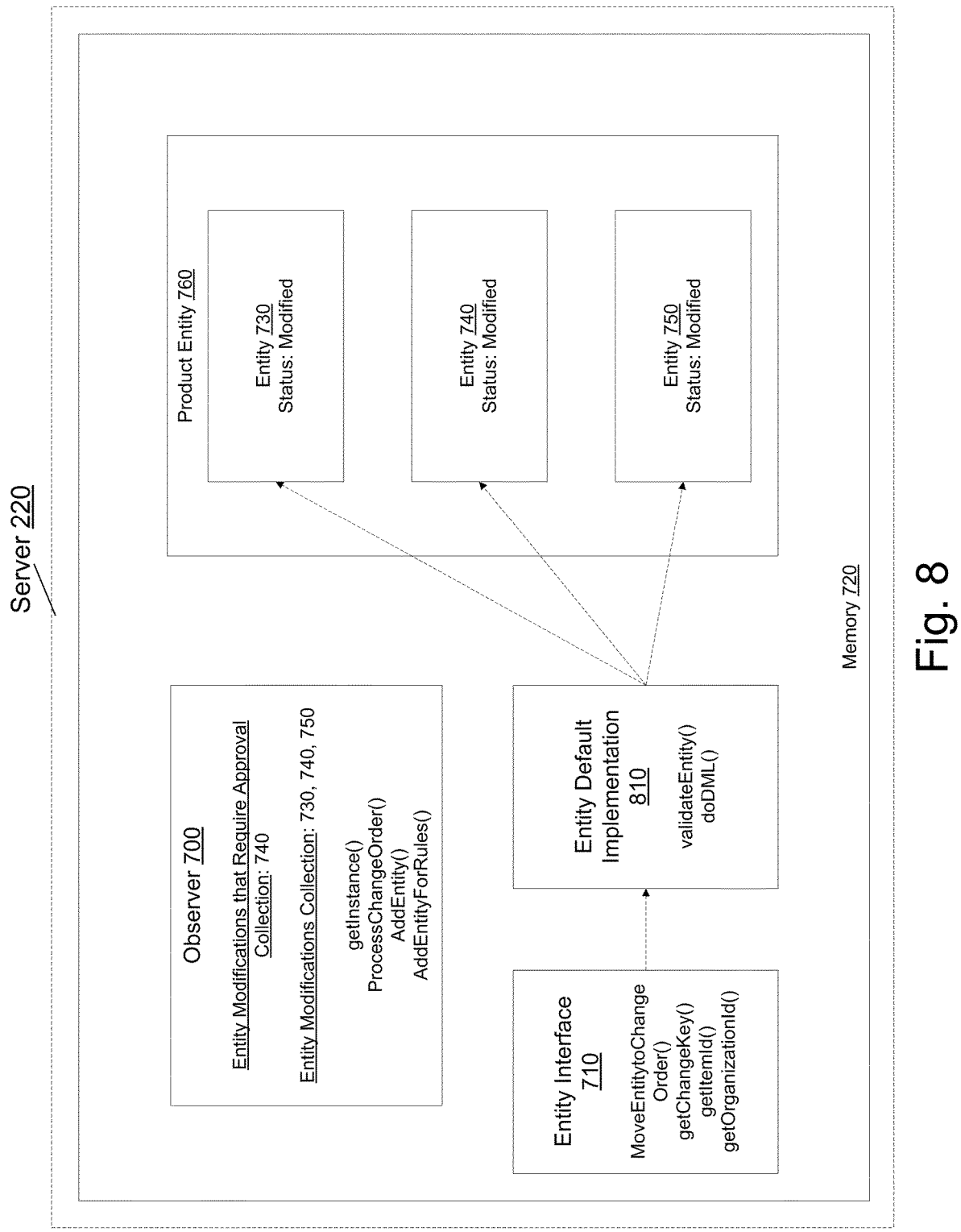
FIG. 8 illustrates an observer collection framework utilized by a product management system according to another embodiment of the invention.

FIG. 8 illustrates an observer collection framework utilized by a product management system according to another embodiment of the invention. The illustrated embodiment is similar to the illustrated embodiment of FIG. 7, except that the illustrated embodiment of FIG. 8 also includes entity default implementation 810. According to the embodiment of the invention, entity default implementation 810 provides a default implementation of the following methods: validateEntity( ) and doDML( ). Thus, an entity (such as entities 730, 740, and 750) can simply extend entity default implementation 810, and do not need to implement these methods. However, if the default behavior of the methods validateEntity( ) and doDML( ) an entity can override either method (or both methods) and provide its own behavior.

According to the default implementation of the validateEntity( ) method, it is determined whether the entity that invokes the method has been modified. If the entity has been modified, then the entity is added to the second collection of observer 700. If the entity has not been modified, then the entity is removed from the second collection of observer 700. Thus, the second collection of observer 700 only contains entities that been modified.

Below is example pseudo-code for the default implementation of the validateEntity( ) method of entity default implementation 810, according to an embodiment of the invention:

```
protected void validateEntity( )
{
//adding entity to collection if dirtied.
    if (isDirty( ) && !isPending( ) && canAddtoCollection( ))
    {
        Observer.addEntity(entity);
    }else {
        Observer.removeEntity(entity);
    }
}
```

According to the default implementation of the DoDML( ) method, it is determined whether the entity has been modified. If the entity is modified, and the entity has not declared that a DML operation should not be performed, the method performs the appropriate DML operation for the entity. An entity can declare a DML operation should not be performed, by setting a flag for example. One reason an entity may declare a DML operation should not be performed is that the entity is being added to the change order, and the modification should not be stored to the production context until the change order is processed and approved. If a DML operation is skipped for an entity, the entity can also be reset, so that the values of the entity are reset back to the values stored in the database for that entity.

Below is example pseudo-code for the default implementation of the DoDML( ) method of entity default implementation 810, according to an embodiment of the invention:

```
protected void doDML(int operation, TransactionEvent transactionEvent)
{
    if(isDoDmlCalled( ) && (getEntityState( ) != STATUS_INITIALIZED &&
getEntityState( ) != STATUS_NEW ))
        return;
    setDoDmlCalled(true);
    if (operation != DML_DELETE)
    {
        if (isPending( ) && !skipDML( ))
        {
        ...// DO DML FOR ENTITY
        }
        //skipping tl dodml
        if (skipDML( ))
        {
            if (entity.getAttributeIndexOf(OA_TL_ENTITIES_COL) != -1)
            {
                EntityRowSetImpl tlEOs =
                    (EntityRowSetImpl) entity.getAttribute(OA_TL_ENTITIES_COL);
                tlEOs.reset( );
                for (Object tlEO: tlEOs)
                {
                    tlEO.setSkipDML(true);
                }
            }
            return;
        }
        if (!skipDML( )){
            ((EntityInterface) entity).doDMLSuper(operation,
                    transactionEvent);
        }
    }
}
```

Figure 9:
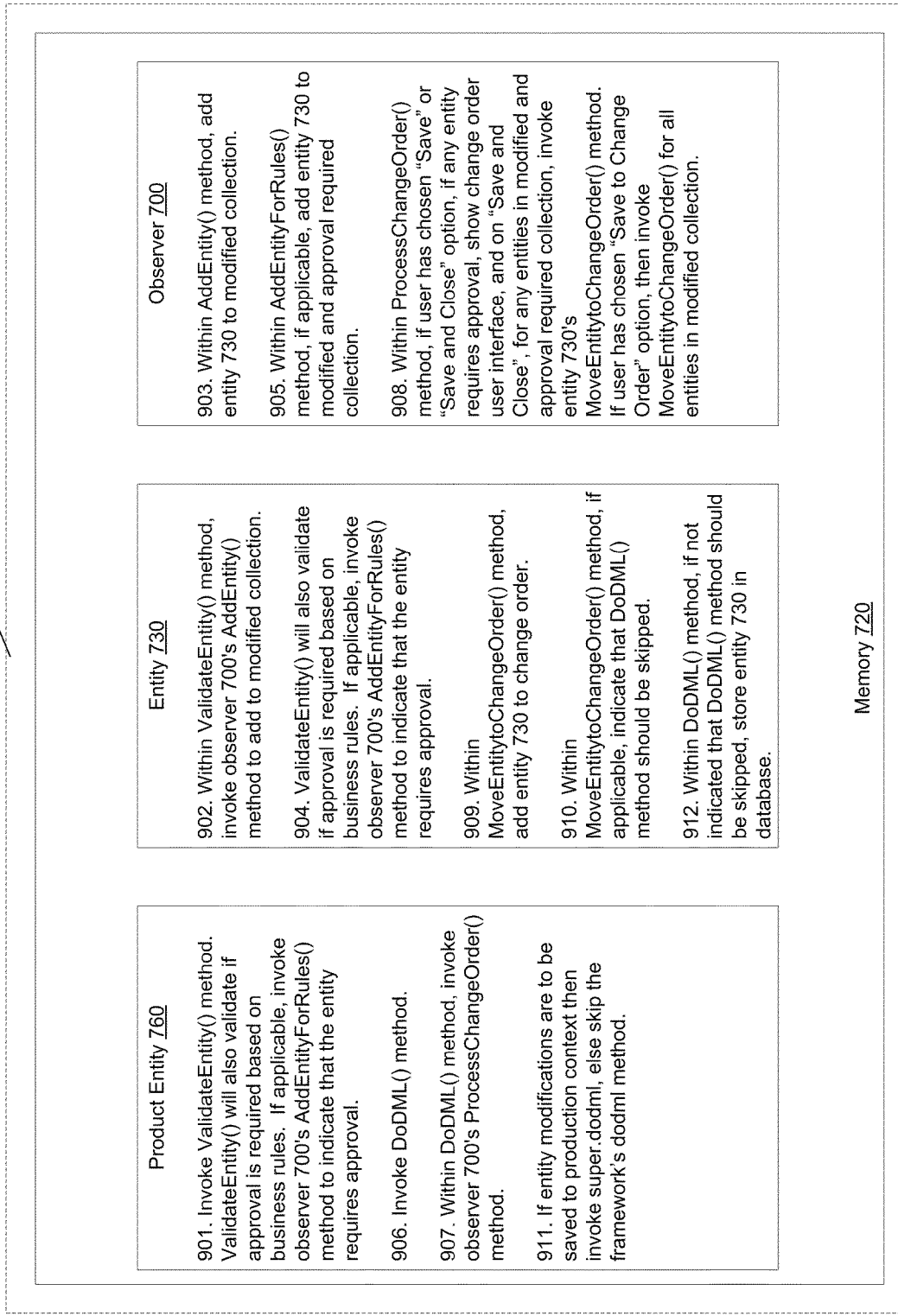
FIG. 9 illustrates a process flow of an observer collection framework according to an embodiment of the invention.

FIG. 9 illustrates a process flow of an observer collection framework according to an embodiment of the invention. The illustrated embodiment illustrated a process flow that occurs between the entities of the observer collection framework described in FIGS. 7 and 8. The illustrated embodiment includes server 220 of FIG. 2, which includes memory 720. As previously described, server 220 is a component of the product management system configured to store and perform the business logic of the product management system, and to represent the data of the product management system in memory 720. As previously described, memory 720 can be comprised of any combination of RAM, ROM, static storage such as a magnetic or optical disk, or any other type of machine or computer-readable medium.

The illustrated embodiment also includes product entity 760, entity 730, and observer 700 of FIG. 7. In the illustrated embodiment, product entity 760 is only composed of entity 730. While entity 740 and entity 750 are not included in the illustrated embodiment, for purposes of clarity, one of ordinary skill in the art would readily appreciate that, in alternate embodiment, product entity can be composed of entities 730, 740, and 750, and the process implemented by entity 730 can also be implemented by entities 740 and 750.

According to the embodiment, at 901, a ValidateEntity( ) method of all entities (in the illustrated embodiment, entity 730 and product entity 760) are invoked. The order of invocation on entities can occur in any order. The ValidateEntity( ) method can also validate if an approval is required based on business rules. If applicable, an AddEntityForRules( ) method of observer 700 can be invoked to indicate that the entity requires approval.

At 902, within the ValidateEntity( ) method of entity 730, an AddEntity( ) method of observer 700 is invoked to add entity 730 to a collection that includes all modified entities. At 903, within the AddEntity( ) method of observer 700, entity 730 is added to a collection that includes all modified entities (i.e., the modified collection). At 904, within the ValidateEntity( ) method of entity 730, if a modification of entity 730 requires approval based on business rules, an AddEntityForRules( ) method of observer 700 is invoked. At 905, within the AddEntityForRules( ) method of observer 700, if a modification of entity 730 requires approval, entity 730 is added to a collection that includes all modified entities that require approval (i.e., the modified and approval required collection). In an embodiment where product entity 760 is composed of multiple entities, 902, 903, 904, and 905 are performed for each entity.

At 906, a DoDML method( ) of product entity 760 is invoked. At 907, within the DoDML( ) method of product entity 760, a ProcessChangeOrder( ) method of observer 700 is invoked. This method separates the entities which include a modification that requires approval from the entities which do not include a modification that requires approval. At 908, within the ProcessChangeOrder( ) method of observer 700, if a user has chosen a "Save" or "Save and Close" option, if entity 730 is in the modified and approval required collection, then a MoveEntityToChangeOrder( ) method of entity 730 is invoked. If a user has chosen a "Save to Change Order" option, then a MoveEntitytoChangeOrder( ) method of each entity in the modified collection is invoked. In an embodiment where product entity 760 is composed of multiple entities, the MoveEntityToChangeOrder( ) method of each entity which is in the modified and approval required collection is invoked.

At 909, within the MoveEntityToChangeOrder( ) method of entity 730, entity 730 is added to a change order. At 910, within the MoveEntityToChangeOrder( ) method of entity 730, if the business logic of entity 730 indicates that entity 730 should not be stored in the database because entity 730 is being added to a change order, then entity 730 indicates that the DoDML( ) method should be skipped. However, the delta copy of the entity modifications will be saved in a change context. In an embodiment where product entity 760 is composed of multiple entities, 909 and 910 are performed for each entity.

At 911, within the DoDML( ) method of product entity 760, if entity modifications are to be saved to production context, then super.dodml is invoked. Otherwise, the framework's dodml method is skipped. At 912, within the DoDML( ) method of entity 730, entity 730 is stored in the database unless entity 730 has previously indicated that the DoDML( ) method should be skipped. In an embodiment where product entity 760 is composed of multiple entities, 911 and 912 are performed for each entity.

Figure 10:
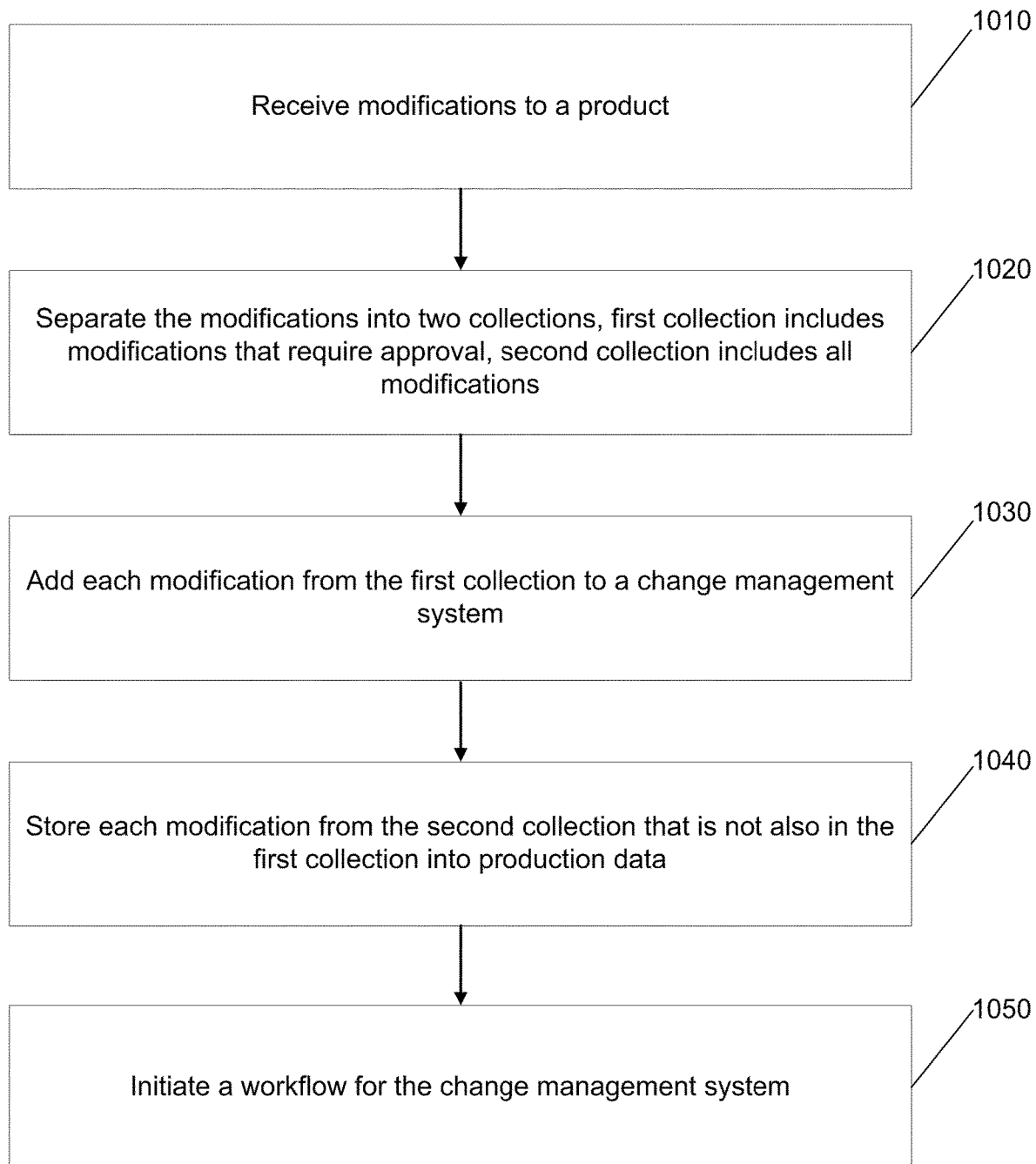
FIG. 10 illustrates a flow diagram of the functionality of a product information module according to an embodiment of the invention.

FIG. 10 illustrates a flow diagram of the functionality of a product information module according to an embodiment of the invention. In one embodiment, the functionality of the flow diagram of FIG. 10 is implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1010, one or more modifications to a product are received. At 1020, the one or more modifications are separated into two collections. The first collection includes modifications that require approval. The second collection includes all modifications. At 1030, each modification from the first collection is added to a change management system. According to an embodiment of the system, the change management system includes a change order. At 1040, each modification from the second collection that is not also in the first collection is stored in a database. At 1050, a workflow for the change management system is initiated.

FIGS. 11-24 will now be discussed. FIGS. 11-24 illustrate a user interface of a product management system. Specifically, FIGS. 11-24 illustrate a process of creating product information modifications and saving the product information modifications to the product management system. One of ordinary skill in the art would readily appreciate that the embodiments illustrated in FIGS. 11-24 are merely example embodiments of the user interface, and that the user interface may use a format different than the format illustrated in FIGS. 11-24, or may include different content than the content illustrated in FIGS. 11-24, and still be within the scope of the invention.

FIG. 11 illustrates a user interface for modifying product information according to an embodiment of the invention. The illustrated embodiment includes user interface 1100. User interface 1100 is the user interface displayed to a user after a user selects a product and the product management system retrieves the product from the database. User interface is an editable user interface and is configured to allow a user to modify information of the product.

Figure 12:
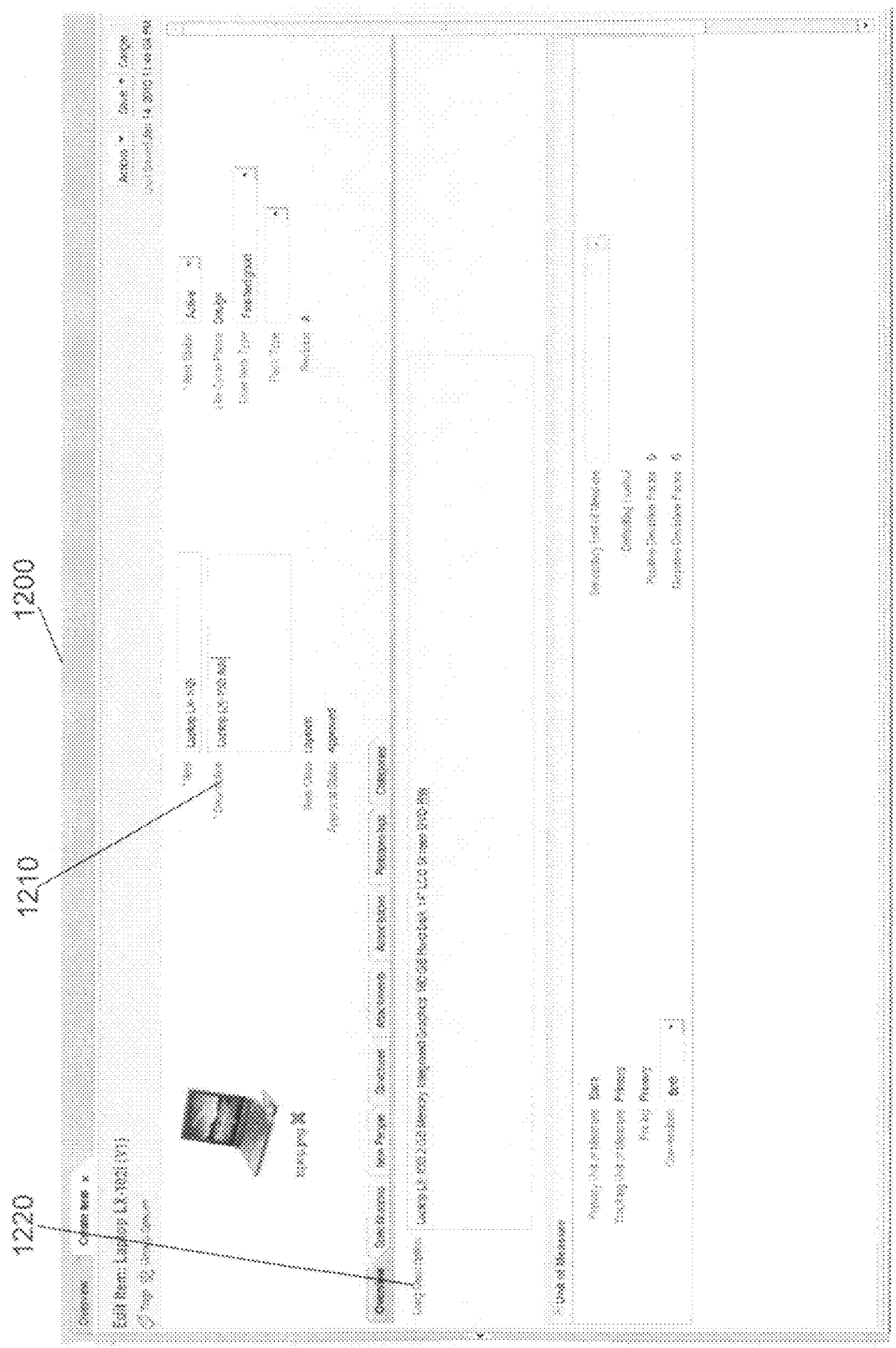
FIG. 12 illustrates a user interface with modifications for product information according to an embodiment of the invention.

FIG. 12 illustrates a user interface with modifications for product information according to an embodiment of the invention. The illustrated embodiment includes user interface 1200. User interface 1200 is similar to user interface 1100, but displays modifications that the user has made to the product. Specifically, at description 1210, the user has modified the product description from "Laptop LX-102i" to "Laptop LX-102i Adv." Also, at long description 1220, the user has entered a value "Laptop LX-102i 2 GB Memory Integrated Graphics 160 GB Hard Disk 14" LCD Screen DVD-RW," where long description 1220 originally did not include a value. One of ordinary skill in the art would readily appreciate that the product information modifications described in relation to FIG. 12 are merely example product information modifications, and that a user can modify other information that is displayed for the product at the user interface. Furthermore, in alternate embodiments, the modifications involved can be of a more complex nature.

FIG. 13 illustrates a user interface for modifying product information, which depicts two save options according to an embodiment of the invention. The illustrated embodiment includes user interface 1300. User interface 1300 is similar to user interface 1200, but also displays two additional buttons, Save and Close 1310 and Save to Change Order 1320. Save and Close 1310 and Save to Change Order 1320 are displayed in response to the user selecting Save 1330. If the user selects Save and Close 1310, then the product management system validates the product and all product information, and attempts to save all product information modifications to the database. If any product information modifications require approval, then those product information modifications are separated from the remaining product information modifications. The remaining product information modifications are saved to the database, and a change order menu is displayed to the user to select a change order to move the product information modifications that require approval. If instead the user selects Save to Change Order 1320, then all product information modifications are moved to a change order, and the change order menu is displayed to the user to select a change order to move the product information modifications. The change order menu is discussed in further detail in relation to FIGS. 14-18.

FIG. 14 illustrates a user interface for saving product information modifications to a change order according to an embodiment of the invention. The illustrated embodiment includes user interface 1400. User interface 1400 is similar to user interface 1300, but also displays change order menu 1410. Change order menu 1410 allows a user to either create a new change order for the product information modifications or select an existing change order for the product information modifications. If a user selects to create a new change order, then the product management system will create a new change order before moving the targeted product information modifications. If a user selects to add to an existing change order, then the product management system will retrieve the existing change order selected by user before moving the targeted product information modifications to the change order context grouped under revised items. In the illustrated embodiment, the user has decided to create a new change order. Thus, the user has selected Create Change Order 1420 in user interface 1400.

FIG. 15 illustrates another user interface for saving product information modifications to a new change order according to an embodiment of the invention. The illustrated embodiment includes user interface 1500. Similar to user interface 1400, user interface 1500 displays change order menu 1510. Change order menu 1510 is similar to change order menu 1410, but in FIG. 15 the user has also entered a change order type at Change Order Type 1520. Specifically, the user has entered "Design Change Order Type" at Change Order Type 1520. The change type chosen at this stage can decide the workflow steps and assignees/approvers at various workflow steps. According to the embodiment, the user can enter the change order type either by inputting the change order type or by selecting the change order type from a drop-down list of possible change order types. Change order menu 1510 also includes OK 1530. The user can select OK 1530 once a user has entered a change order type at Change Order Type 1520.

FIG. 16 illustrates a user interface for creating a change order according to an embodiment of the invention. The illustrated embodiment includes user interface 1600. User interface 1600 is similar to user interface 1500, but user interface 1600 displays Create Change Order menu 1610. Create Change Order menu 1610 is displayed as a result of the user selecting OK 1530 of FIG. 15. Create Change Order menu 1620 displays fields which allow a user to input information about the new change order. In the illustrated embodiment, the user has input information at AssigneeIdText 1620 and RequestorIdText 1630.

FIG. 17 illustrates a user interface for creating a change order with details entered according to an embodiment of the invention. The illustrated embodiment includes user interface 1700. Similar to user interface 1600, user interface 1700 displays Create Change Order menu 1710. Create Change Order menu 1710 is similar to Create Change Order Menu 1610, but in FIG. 17 the user has entered additional change order information. Specifically, the user has entered information for Number 1720, Name 1730, and Description 1740.

Once the user has entered the change order information, the user can either select Save and Close 1750 or Save and Edit 1760. If the user selects Save and Close 1750, which indicates that the user does not wish to further modify the change order, the product management system creates the change order, moves the targeted modifications to the change order, saves the change order to the database, and closes user interface 1700. If the user selects Save and Edit 1760, which indicates that the user does wish to further modify the change order, the product management system creates the change order, moves the targeted modifications to the change order, saves the change order to the database, and displays user interface 1900 of FIG. 19, which allows the user to further modify the newly created change order, and which will be discussed in greater detail.

FIG. 18 illustrates a user interface for saving product information modifications to an existing change order according to an embodiment of the invention. The illustrated embodiment includes user interface 1800. User interface is similar to user interface 1400, but the user has selected Add to Existing Change Order 1820. When a user selects Add to Existing Change Order, the user can enter which change order the user would like to add the product information modifications to. In the illustrated embodiment, the user has selected the change order "ANR1_10110."

Once the user has entered the change order information, the user can either select Save and Close 1840 or Save and Edit 1850. If the user selects Save and Close 1840, which indicates that the user does not wish to further modify the existing change order, the product management system moves the targeted modifications to the existing change order, saves the existing change order to the database, and closes user interface 1800. If the user selects Save and Edit 1850, which indicates that the user does wish to further modify the existing change order, the product management system moves the targeted modifications to the existing change order, saves the existing change order to the database, and displays user interface 1900 of FIG. 19, which allows the user to further modify the existing change order, and which will be discussed in greater detail.

FIG. 19 illustrates a user interface for displaying an editable view of a change order according to an embodiment of the invention. The illustrated embodiment includes user interface 1900. Upon selecting Save and Edit 1760 of FIG. 17 or Save and Edit 1850 of FIG. 18, the product management system displays user interface 1900. User interface 1900 displays the selected change order, and allows the user to make further modifications to the change order. The modifications can be to the change order itself or to the product associated with the change order. In the illustrated embodiment, user interface 1900 displays attributes of the change order in Overview 1910.

Figure 20:
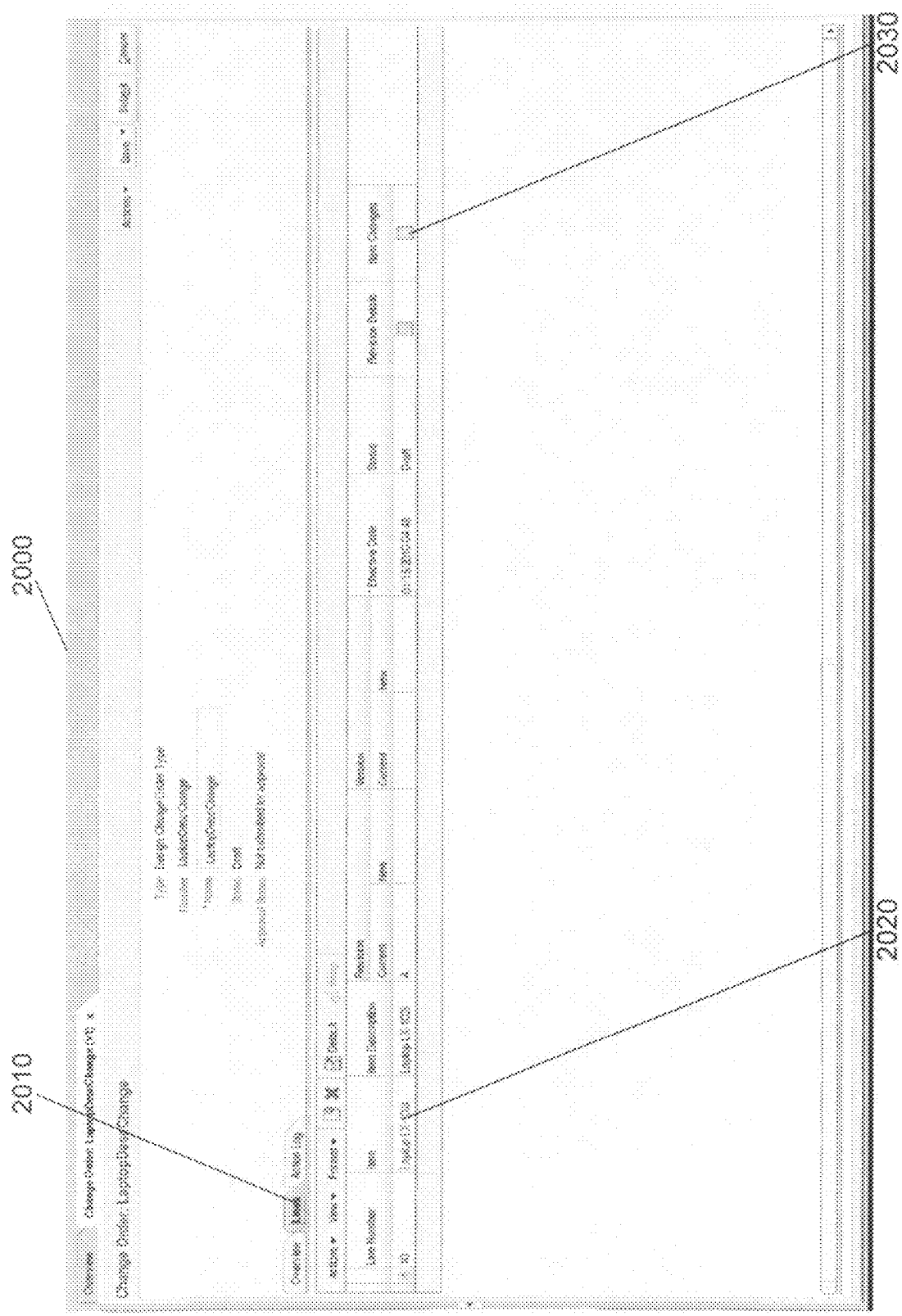
FIG. 20 illustrates a user interface for displaying an editable view of revised item lines in a change order according to an embodiment of the invention.

FIG. 20 illustrates a user interface for displaying an editable view of revised item lines in a change order according to an embodiment of the invention. The illustrated embodiment includes user interface 2000. User interface 2000 is similar to user interface 1900, but instead of displaying attributes of the change order in Overview 1910, user interface 2000 displays one or more lines of the change order in Lines 2010. User interface 2000 also displays Item 2020. Item 2020 is a link to the corresponding product of the change order. When Item 2020 is selected, the product management system will display the product and allow the user to make further modifications to the product. User interface 2000 also displays Item Changes 2030. Item Changes 2030 is a link to the product information modifications. When Item Changes 2030 is selected, the product management system will display the product information modifications.

Figure 21:
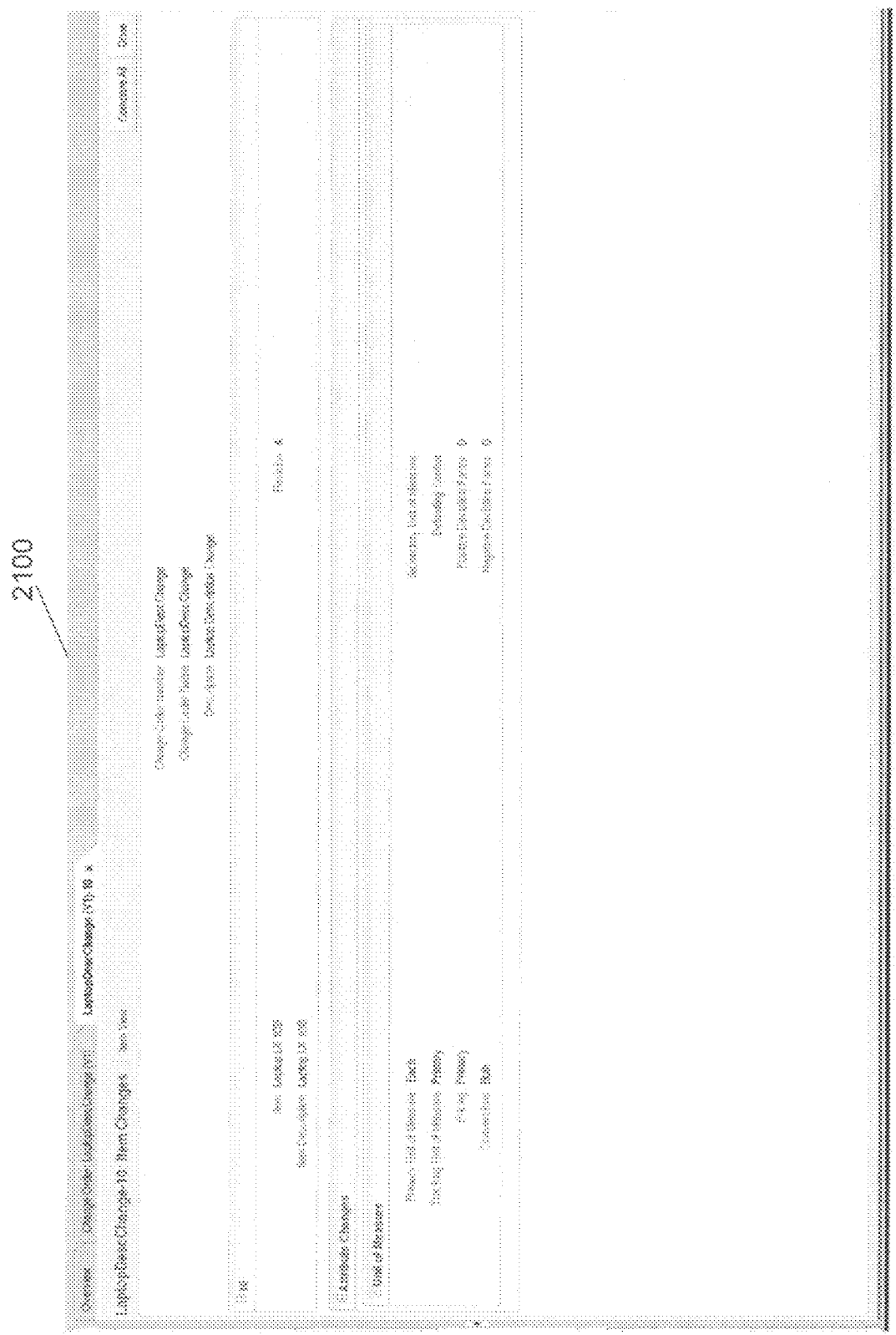
FIG. 21 illustrates a user interface for displaying product modifications of a change order according to an embodiment of the invention.

FIG. 21 illustrates a user interface for displaying product modifications of a change order according to an embodiment of the invention. The illustrated embodiment includes user interface 2100. User interface 2100 is displayed as a result of a user selecting Item Changes 2030 of user interface 2000 in FIG. 20. User interface 2100 displays product modifications which occur as part of the corresponding change order.

Figure 22:
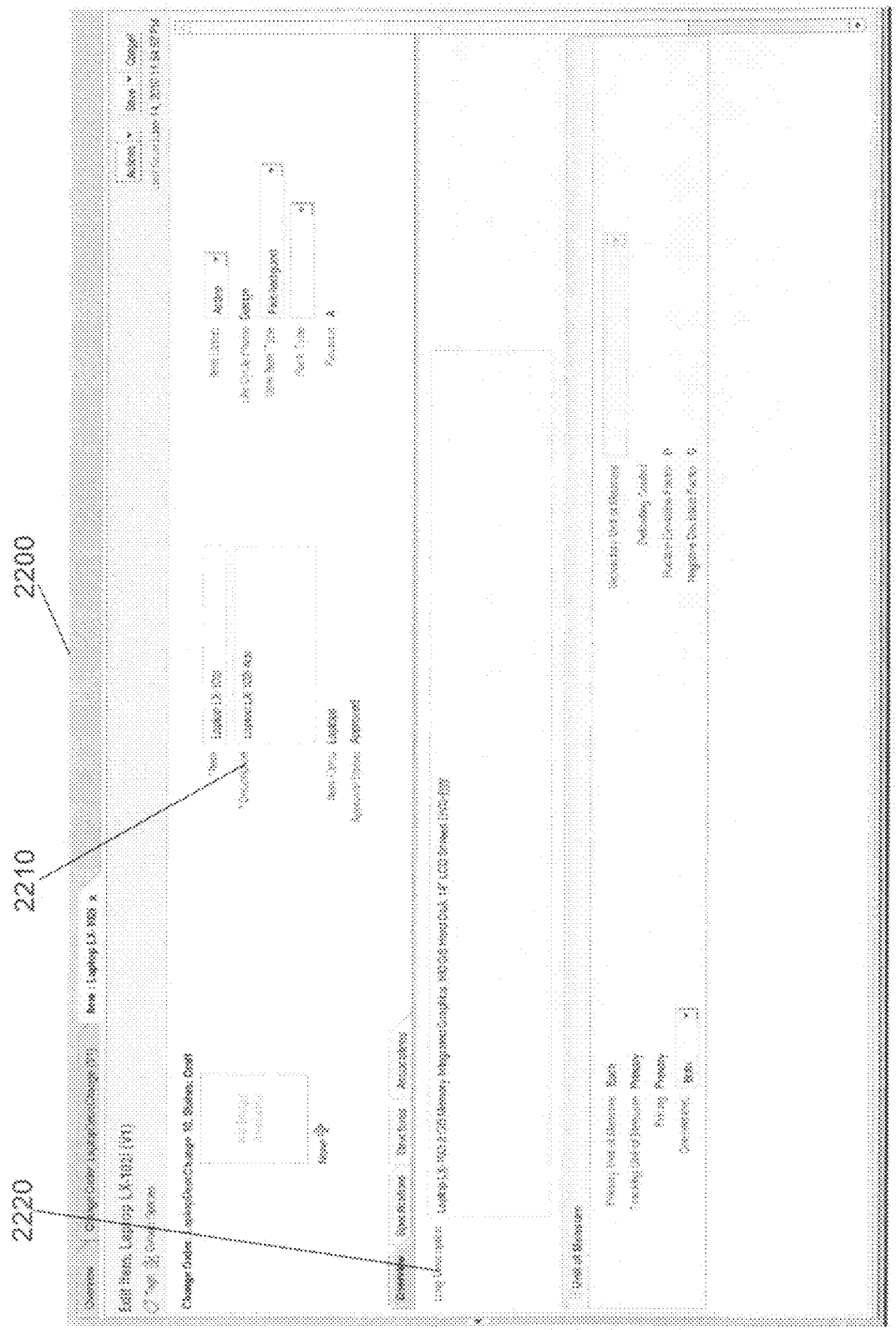
FIG. 22 illustrates a user interface for displaying an editable view of a product in a change context according to an embodiment of the invention.

FIG. 22 illustrates a user interface for displaying an editable view of a product in a change context according to an embodiment of the invention. The illustrated embodiment includes user interface 2200. User interface 2200 is displayed as a result of a user selecting Item 2020 of user interface 2000 in FIG. 20. User interface 2200 displays a product's data in the corresponding change order context. Because the display is in a change order context, user interface 2200 displays the modifications made to the product, even though the modifications have not yet been saved to the production context. In the illustrated embodiment, user interface 2200 displays Description 2210, where the modified value "LAPTOP LX-102i Adv," is also displayed as well, and user interface 2200 also displays Long Description 2220, where the modified value "Laptop LX-102i 2 GB Memory Integrated Graphics 160 GB Hard Disk 14" LCD Screen DVD-RW," is also displayed as well. The view displayed in user interface 2200 is editable, so the user can make further modifications to the product displayed in user interface 2200.

Figure 23:
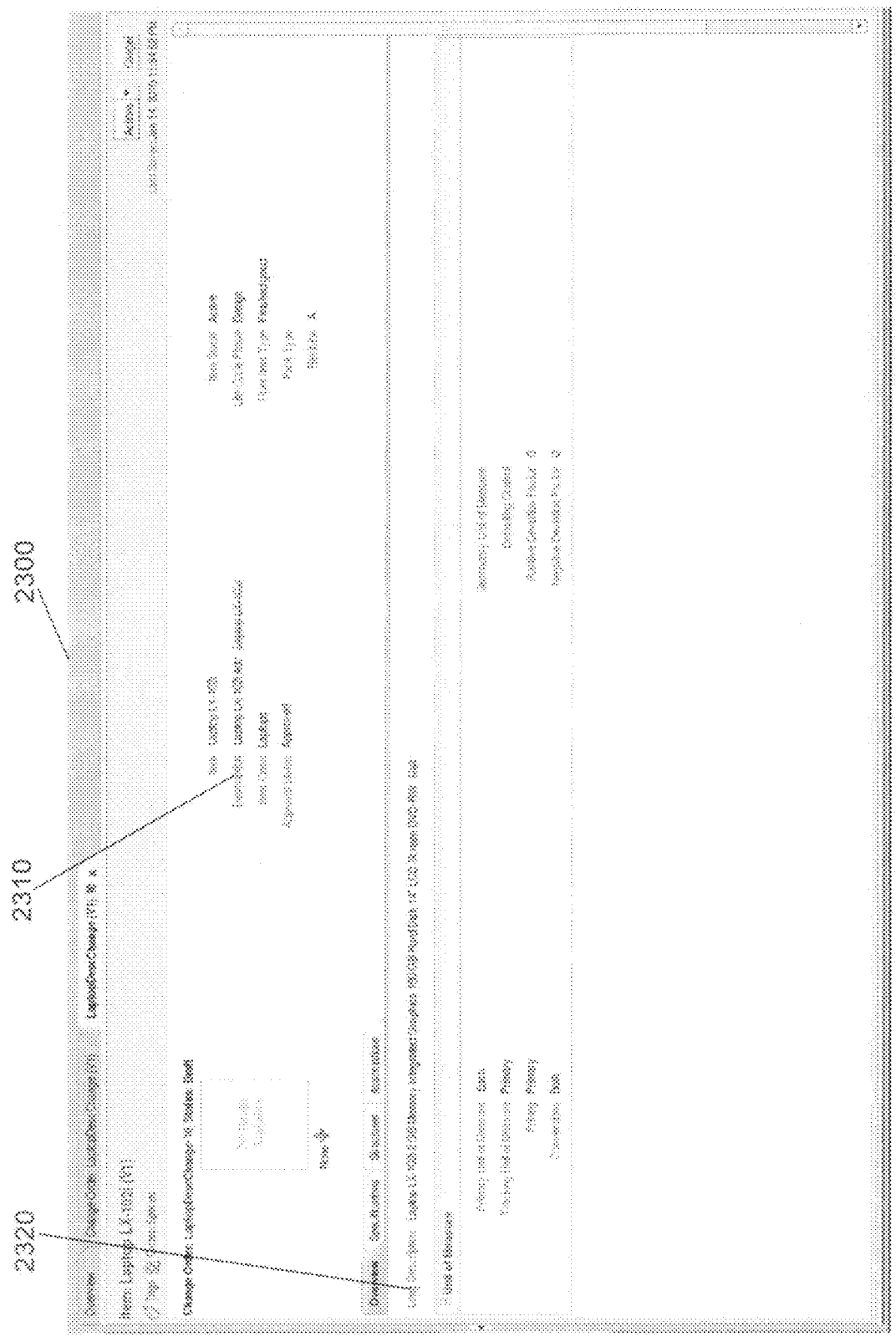
FIG. 23 illustrates a user interface for displaying a non-editable view of a product in a change context according to an embodiment of the invention.

FIG. 23 illustrates a user interface for displaying a non-editable view of a product in a change context according to an embodiment of the invention. The illustrated embodiment includes user interface 2300. User interface 2300 is similar to user interface 2200, but instead of resulting from a user selecting Item 2020 of user interface 2000 in FIG. 20, user interface 2300 results from the user selecting the change order in a view mode, rather than an edit mode. Because the change order is selected in a view mode, the view displayed in user interface 2300 is not editable, so the user cannot make further modifications to the product displayed in user interface 2300. Because the display is in a change order context, user interface 2300 displays the modifications made to the product, even though the modifications have not yet been saved to the database. However, user interface 2300 displays the original product values redlined against the modified product values (i.e., product modifications). Specifically, in the illustrated embodiment, user interface 2300 displays Description 2310, which includes a red-lined version of the original value, "Laptop LX-102i," and the modified value "Laptop LX-102i Adv." User interface 2300 also displays Long Description 2320, which includes a red-lined version of the original value, a null value, and the modified value "Laptop LX-102i 2 GB Memory Integrated Graphics 160 GB Hard Disk 14" LCD Screen DVD-RW."

Figure 24:
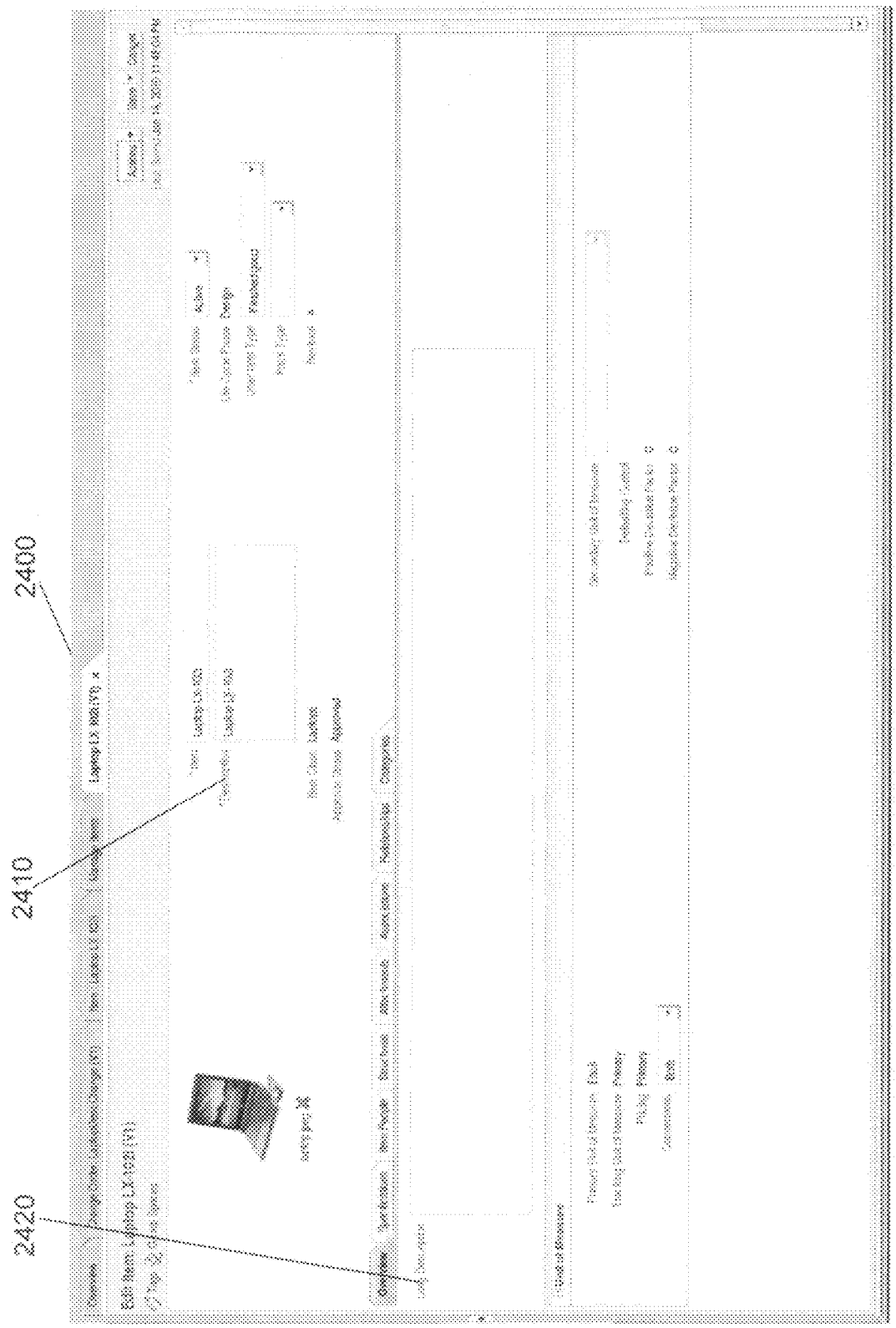
FIG. 24 illustrates a user interface for displaying an editable view of a product in a production context according to an embodiment of the invention.

FIG. 24 illustrates a user interface for displaying an editable view of a product in a production context according to an embodiment of the invention. The illustrated embodiment includes user interface 2400. User interface 2400 results from a user selecting the product that the user previously modified and selecting to edit the product in a production context. A production context means that the information on the product is viewed as in production. As can be seen in FIG. 24, the product displayed in user interface 2400 does not include any modifications by the user that have merely been saved to a change order, and have not been saved to production. Thus, in the illustrated embodiment, user interface 2400 displays Description 2410, which includes the original value "Laptop LX-102i," and user interface displays Long Description 2420, which does not include a value, as Long Description 2420 did not originally have a value. Thus, the modified description value "Laptop LX-102i Adv,' and the modified long description value "Laptop LX-102i 2 GB Memory Integrated Graphics 160 GB Hard Disk 14" LCD Screen DVD-RW" are not displayed in user interface 2400.

Thus, according to an embodiment of the invention, a new product management system is provided where a user is not required to resubmit modifications requiring approval through a change management system, such as a change order. Furthermore, a user does not have to be familiar with separate user interfaces for submitting changes to a change management system. According to the embodiment, the product management system will separate out the modifications requiring approval, and will process those modifications without any rework efforts on the part of the user. Thus, more of the process can be automated, the process can require fewer manual steps, and the user has the options of moving all the modifications, or only the modifications requiring approval, through a change order.

The features, structures, or characteristics of the invention described throughout this specification may be combined in any suitable manner in one or more embodiments. For example, the usage of "an embodiment," "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "an embodiment," "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon that, when executed by a processor, cause the processor to process and use production data in a production context, the processing and using comprising:

instantiating an observer from a static class, the observer including a first collection of entities and a second collection of entities;

creating an entity interface including an application programming interface that declares a set of methods for implementation by entities;

retrieving production data associated with a manufactured product from a product database coupled to a network, the production data including a description of the manufactured product and a plurality of attributes of the manufactured product, the product database including a plurality of data tables, each data table including a plurality of rows, each row including a plurality of fields, the production data being stored across one or more rows of one or more tables of the product database;

creating a product entity associated with the manufactured product, the product entity including a plurality of entities, each entity including one or more attributes retrieved from the product database and an attribute bitmap including a modification bit for each attribute, each modification bit being set to a first value indicating that the respective attribute has not been modified;

receiving one or more modifications to one or more attributes of one or more of the plurality of entities associated with the manufactured product from a user computer coupled to the network;

for each received modification, modifying the respective attribute in the respective entity, and setting the respective modification bit in the respective attribute bitmap to a second value indicating that the respective attribute has been modified;

adding each modified entity that requires approval to the first collection of the observer entity;
adding each modified entity that requires approval and each modified entity that does not require approval to the second collection of the observer entity;
storing each modified entity of the second collection that is not also of the first collection into the product database using the application programming interface;
initiating a workflow for at least one change order to process the modified entities that require approval, including
   adding each modified entity of the first collection to the change order using the application programming interface, including:
      creating a copy of the entity;
      extracting one or more modified attributes from the modified entity based on the modification bit values in the attribute bitmap;
      moving the modified attributes from the modified entity to the copy of the entity; and
      moving the copy of the entity, including the modified attributes, to the change order;
receiving approval for at least one modified entity of the first collection; and
storing each approved modified entity of the first collection into the product database, based on the effective date of the approved modified entity, using the application programming interface.

2. The computer-readable medium of claim 1,
wherein the set of methods comprises a default implementation of the application programming interface;
wherein the entity extends the default implementation;
wherein each modified entity of the first collection adds itself to the change order using the default implementation; and
wherein storing each modified entity of the second collection that is not also in the first collection into the product database uses the default implementation.

3. The computer-readable medium of claim 1, wherein the workflow for the change order to process the modified entities includes:
sending the change order for approval; and
receiving the approval for the change order.

4. The computer-readable medium of claim 1, wherein the observer entity is associated with the product using a product identity and an organization identity.

5. The computer-readable medium of claim 1, wherein the plurality of entities are components of an Oracle Application Development Framework.

6. The computer-readable medium of claim 1, wherein adding each modified entity of the first collection to the change order includes:
marking each modified entity as requiring approval; and
adding each modified entity to the change order.

7. The computer-readable medium of claim 1, wherein adding each entity of the first collection to the change order includes:
marking each copy of each entity for deletion.

8. The computer-readable medium of claim 1, wherein the processing and using production data in a production context further comprises:
during production of the manufactured product, receiving requests for production data associated with the manufactured product stored in the product database from a plurality of production devices over the network.

9. The computer-readable medium of claim 1, wherein said adding each modified entity of the first collection to the change order using the application programming interface further comprises:
assigning an effective date to each modified entity of the first collection, the effective date indicating when the modified entity of the first collection is to be stored in the product database once approved.

10. A computer-implemented method for processing and using production data in a production context, comprising:
instantiating an observer from a static class, the observer including a first collection of entities and a second collection of entities;
creating an entity interface including an application programming interface that declares a set of methods for implementation by entities;
retrieving production data associated with a manufactured product from a product database coupled to a network, the production data including a description of the manufactured product and a plurality of attributes of the manufactured product, the product database including a plurality of data tables, each data table including a plurality of rows, each row including a plurality of fields, the production data being stored across one or more rows of one or more tables of the product database;
creating a product entity associated with the manufactured product, the product entity including a plurality of entities, each entity including one or more attributes retrieved from the product database and an attribute bitmap including a modification bit for each attribute, each modification bit being set to a first value indicating that the respective attribute has not been modified;
receiving one or more modifications to one or more attributes of one or more of the plurality of entities associated with the manufactured product from a user computer coupled to the network;
for each received modification, modifying the respective attribute in the respective entity, and setting the respective modification bit in the respective attribute bitmap to a second value indicating that the respective attribute has been modified;
adding each modified entity that requires approval to the first collection of the observer entity;
adding each modified entity that requires approval and each modified entity that does not require approval to the second collection of the observer entity;
storing each modified entity of the second collection that is not also of the first collection into the product database using the application programming interface;
initiating a workflow for at least one change order to process the modified entities that require approval, including:
   adding each modified entity of the first collection to the change order using the application programming interface, including:
      creating a copy of the entity;
      extracting one or more modified attributes from the modified entity based on the modification bit values in the attribute bitmap;
      moving the modified attributes from the modified entity to the copy of the entity; and
      moving the copy of the entity, including the modified attributes, to the change order;
receiving approval for at least one modified entity of the first collection; and storing each approved modified entity of the first collection into the product database, based on the effective date of the approved modified entity, using the application programming interface.

11. The computer-implemented method of claim 10, wherein the set of methods comprises a default implementation of the application programming interface;
wherein the entity extends the default implementation;
wherein each modified entity of the first collection is added to the change order using the default implementation; and
wherein storing each modified entity of the second collection that is not also in the first collection into the product database uses the default implementation.

12. The computer-implemented method of claim 10, wherein the workflow for the change order to process the modifications includes:
sending the change order for approval; and
receiving the approval for the change order.

13. The computer-implemented method of claim 10, further comprising:
during production of the manufactured product, receiving requests for production data associated with the manufactured product stored in the product database from a plurality of production devices over the network.

14. The computer-implemented method of claim 10, wherein said adding each modified entity of the first collection to the change order using the application programming interface further comprises:
assigning an effective date to each modified entity of the first collection, the effective date indicating when the modified entity of the first collection is to be stored in the product database once approved.

15. A product management system for processing and using production data in a production context, comprising:
a product database, coupled to a network, including a plurality of data tables, each data table including a plurality of rows, each row including a plurality of fields, the product database configured to store production data associated with a plurality of manufactured products, the production data for each manufactured product including a description of the manufactured product and a plurality of attributes of the manufactured product, the production data for each manufactured product being stored across one or more rows of one or more tables of the product database;
a user computer, coupled to the network including a user interface configured to display the production data relating to one or more manufactured products and configured to allow a user to modify the production data relating to one or more manufactured products; and
a server, coupled to the network, comprising a processor and a memory, the memory configured to store instructions, the processor configured to execute the instructions stored in the memory, the server configured to:
instantiate an observer from a static class, the observer including a first collection of entities and a second collection of entities;
create an entity interface including an application programming interface that declares a set of methods for implementation by entities;
retrieve production data associated with a manufactured product from the product database;
create a product entity associated with the manufactured product, the product entity including a plurality of entities, each entity including one or more attributes retrieved from the product database and an attribute bitmap including a modification bit for each attribute, each modification bit being set to a first value indicating that the respective attribute has not been modified;
receive one or more modifications to one or more attributes of one or more entities associated with the manufactured product from the user computer;
for each received modification, modify the respective attribute in the respective entity, and set the respective modification bit in the respective attribute bitmap to a second value indicating that the respective attribute has been modified;
add each modified entity that requires approval to the first collection of the observer entity;
add each modified entity that requires approval and each modified entity that does not require approval to the second collection of the observer entity;
store each modified entity of the second collection that is not also of the first collection into the product database using the application programming interface;
initiate a workflow for at least one change order to process the modified entities that require approval, including:
add each modified entity of the first collection to the change order using the application programming interface including:
create a copy of the entity;
extract one or more modified attributes from the modified entity based on the modification bit values in the attribute bitmap;
move the modified attributes from the modified entity to the copy of the entity; and
move the copy of the entity, including the modified attributes, to the change order;
receive approval for at least one modified entity of the first collection; and
store each approved modified entity of the first collection into the product database, based on the effective date of the approved modified entity, using the application programming interface.

16. The product management system of claim 15:
wherein the set of methods comprises a default implementation of the application programming interface;
wherein the entity extends the default implementation;
wherein each modified entity of the first collection is added to the change order using the default implementation; and
wherein storing each modified entity of the second collection that is not also in the first collection in the product database uses the default implementation.

17. The product management system of claim 15, wherein the server is further configured to:
send the change order for approval; and
receive the approval for the change order.

18. The product management system of claim 15, wherein the server is further configured to:
during production of the manufactured product, receive requests for production data associated with the manufactured product stored in the product database from a plurality of production devices over the network.

19. The product management system of claim 15, wherein said add each modified entity of the first collection to the change order using the application programming interface further comprises:

assign an effective date to each modified entity of the first collection, the effective date indicating when the modified entity of the first collection is to be stored in the product database once approved.

\* \* \* \* \*

UNITED STATES PATENT AND TRADEMARK OFFICE
CERTIFICATE OF CORRECTION

PATENT NO. : 10,693,622 B2
APPLICATION NO. : 12/821720
DATED : June 23, 2020
INVENTOR(S) : Gopalakrishnan Page 1 of 1

It is certified that error appears in the above-identified patent and that said Letters Patent is hereby corrected as shown below:

In the Specification

In Column 20, Line 54, delete "doDML( )" and insert -- doDML( ), --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*